United States Patent
Chakrabarti et al.

(10) Patent No.: US 9,298,825 B2
(45) Date of Patent: Mar. 29, 2016

(54) TAGGING ENTITIES WITH DESCRIPTIVE PHRASES

(75) Inventors: Kaushik Chakrabarti, Redmond, WA (US); Surajit Chaudhuri, Redmond, WA (US); Tao Cheng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 692 days.

(21) Appl. No.: 13/298,349

(22) Filed: Nov. 17, 2011

(65) Prior Publication Data

US 2013/0132381 A1 May 23, 2013

(51) Int. Cl.
*G06F 17/30* (2006.01)

(52) U.S. Cl.
CPC .... *G06F 17/30864* (2013.01); *G06F 17/30277* (2013.01)

(58) Field of Classification Search
CPC ............... G06F 17/30278; G06F 17/30277; G06F 17/30663; G06F 17/30616; G06F 17/30734; G06F 17/30684; G06F 17/28; G06F 17/30864
See application file for complete search history.

(56) References Cited

U.S. PATENT DOCUMENTS

| | | | |
|---|---|---|---|
| 7,668,821 B1 | 2/2010 | Donsbach et al. | |
| 7,725,363 B2 | 5/2010 | Speers et al. | |
| 7,870,135 B1 | 1/2011 | Cheung | |
| 2001/0011279 A1 | 8/2001 | Hajjar | |
| 2004/0123233 A1 | 6/2004 | Donsbach et al. | |
| 2004/0243556 A1* | 12/2004 | Ferrucci et al. | 707/3 |
| 2004/0243645 A1* | 12/2004 | Broder et al. | 707/200 |
| 2005/0234891 A1* | 10/2005 | Walther et al. | 707/3 |
| 2009/0100049 A1* | 4/2009 | Cao | 707/5 |
| 2009/0204596 A1* | 8/2009 | Brun et al. | 707/5 |
| 2009/0319257 A1* | 12/2009 | Blume et al. | 704/7 |
| 2010/0268740 A1* | 10/2010 | Barker et al. | 707/783 |
| 2011/0093452 A1* | 4/2011 | Jain | 707/723 |
| 2011/0099162 A1* | 4/2011 | Bradford | 707/723 |
| 2011/0213655 A1* | 9/2011 | Henkin et al. | 705/14.49 |
| 2012/0084657 A1* | 4/2012 | Ranade et al. | 715/733 |
| 2012/0110008 A1* | 5/2012 | Pieper | 707/769 |
| 2012/0221485 A1* | 8/2012 | Leidner et al. | 705/36 R |

(Continued)

OTHER PUBLICATIONS

Agrawal, P., et al., "On Indexing Error-tolerant Set Containment," Retrieved Mar. 25, 2011 at <<http://research.microsoft.com/pubs/119029/p927.pdf>>, In Proceedings of the ACM SIGMOD International Conference on Management of Data (SIGMOD), 2010, pp. 927-938.

(Continued)

*Primary Examiner* — Leslie Wong
(74) *Attorney, Agent, or Firm* — Alin Corie; Sandy Swain; Micky Minhas

(57) ABSTRACT

A plurality of description phrases associated with a first domain may be determined, based on an analysis of a first plurality of documents to determine co-occurrences of the description phrases with one or more name labels associated with the first domain. An entity associated with the first domain may be obtained. An analysis of a second plurality of documents may be initiated to identify co-occurrences of mentions of the obtained entity and one or more of the plurality of description phrases, and contexts associated with each of the co-occurrences of the mentions and description phrases, in each one of the second plurality of documents. A description tag association between the obtained entity and one of the description phrases may be determined, based on an analysis of the identified contexts.

20 Claims, 9 Drawing Sheets

(56) References Cited

U.S. PATENT DOCUMENTS

| | | | | |
|---|---|---|---|---|
| 2012/0221486 A1* | 8/2012 | Leidner et al. | | 705/36 R |
| 2013/0114899 A1* | 5/2013 | Ambwani et al. | | 382/176 |
| 2013/0132366 A1* | 5/2013 | Pieper | | 707/710 |

OTHER PUBLICATIONS

Agrawal, S., et al., "Scalable Ad-hoc Entity Extraction from Text Collections," Retrieved Mar. 25, 2011 at <<http://www.cs.uwaterloo.ca/~ilyas/CS848F08/papers/agrawal2008.pdf >>, In Proc. VLDB'08, 2008, pp. 945-957.

Agrawal, S., et al., "Exploiting Web Search Engines to Search Structured Databases," Retrieved Mar. 25, 2011 at <<http://www2009.org/proceedings/pdf/p501.pdf >>, In WWW 2009, Apr. 20-24, 2009, Madrid, Spain , pp. 501-510.

Ames, M., et al., "Why We Tag: Motivations for Annotation in Mobile and Online Media," Retrieved Mar. 25, 2011 at <<http://citeseerx.ist.psu.edu/viewdoc/download;jsessionid=7397F46FC24485C861587DB8E1B22C42?doi=10.1.1.90.4934&rep=rep1&type=pdf >>, CHI 2007, Apr. 28-May 3, 2007, San Jose, California, 10 pages.

Bautin, M. et al., "Concordance-Based Entity-Oriented Search," Retrieved Mar. 25, 2011 at <<http://www.cs.sunysb.edu/~skiena/lydia/wicpaper-final.pdf >>, In Web Intelligence and Agent Systems, vol. 7 Issue 4, Dec. 2009, pp. 303-319.

Cafarella, M.J., et al., "A Search Engine for Natural Language Applications," Retrieved Mar. 25, 2011 at <<http://www.eecs.umich.edu/~michjc/papers/be_www2005.pdf >>, WWW 2005, May 10-14, 2005, Chiba, Japan, 11 pages.

Carlson, A., et al., "Toward an Architecture for Never-ending Language Learning," Retrieved Mar. 25, 2011 at <<http://www.cs.cmu.edu/~acarlson/papers/carlson-aaai10.pdf >>, In In Proceedings of the Conference on Artificial Intelligence (AAAI), 2010, pp. 1306-1313.

Chaiken, R., et al. "Scope: Easy and Efficient Parallel Processing of Massive Data Sets," Retrieved Mar. 25, 2011 at <<http://www.goland.org/Scope-VLDB-final.pdf >>, In Proc. VLDB '08 (2008), 12 pages.

Chakrabarti, K., et al., "EntityTagger: Automatically Tagging Entities with Descriptive Phrases," Retrieved Sep. 23, 2011 at << ttp://research.microsoft.com/pubs/144170/pp1463-chakrabarti.pdf>>, In Proceedings of the 20th International Conference Companion on World Wide Web (WWW '11), pp. 19-20.

Chakrabarti, S., et al., "Optimizing Scoring Functions and Indexes for Proximity Search in Type-annotated Corpora," Retrieved Mar. 25, 2011 at <<http://www.cse.iitb.ac.in/~soumen/doc/www2006i/fp3090-chakrabarti.pdf >>, WWW 2006, May 23-26, 2006, Edinburgh, Scotland, 10 pages.

Chaudhuri, S., et al., "Heavy-Tailed Distributions and Multi-Keyword Queries," Retrieved Mar. 25, 2011 at <<http://research.microsoft.com/pubs/74048/SIGIR07.pdf >>, SIGIR'07, Jul. 23-27, 2007, Amsterdam, The Netherlands, 8 pages.

Chaudhuri, S., et al., "A Primitive Operator for Similarity Joins in Data Cleaning," Retrieved Mar. 25, 2011 at <<http://research.microsoft.com/pubs/76166/ssjoin.pdf >>, ICDE '06 Proceedings of the 22nd International Conference on Data Engineering (ICDE '06), 2006, 12 pages.

Chaudhuri, S., et al., "Exploiting Web Search to Generate Synonyms for Entities," Retrieved Mar. 25, 2011 at <<http://www2009.eprints.org/16/1/p151.pdf >>, In Proceedings of the 18th International Conference on World Wide Web (WWW 2009), Apr. 20-24, 2009, Madrid, Spain, pp. 151-160.

Chaudhuri, S., et al., "Mining Document Collections to Facilitate Accurate Approximate Entity Matching," Retrieved Mar. 25, 2011 at <<http://www.vldb.org/pvldb/2/vldb09-315.pdf >>, In Proceedings of the VLDB Endowment, vol. 2 Issue 1, Aug. 2009, pp. 395-406.

Cheng, T., et al., "Entityrank: Searching Entities Directly and Holistically," Retrieved Mar. 25, 2011 at <<http://citeseerx.ist.psu.edu/viewdoc/download?doi=10.1.1.123.1267&rep=rep1&type=pdf >>, In Proceedings of the 33rd International Conference on Very Large Data Bases (VLDB '07), 2007, pp. 387-398.

Chirita, P-A., et al., "P-TAG: Large Scale Automatic Generation of Personalized Annotation TAGs for the Web," Retrieved Mar. 25, 2011 at <<http://citeseerx.ist.psu.edu/viewdoc/download?doi=10.1.1.62.8348&rep=rep1&type=pdf >>, In Proceedings of the 16th International Conference on World Wide Web (WWW2007), May 8-12, 2007, Banff, Canada, pp. 845-854.

Etzioni, O., et al., "Web-scale Information Extraction in Knowitall," Retrieved Mar. 25, 2011 at <<http://citeseer.ist.psu.edu/viewdoc/download;jsessionid=72CD4338460E3F87062551A135COCCB6?doi=10.1.1.1.1636&rep=rep1&type=pdf >>, In Proceedings of the 13th international conference on World Wide Web (WWW '04), 2004, pp. 100-110.

Hearst, M. A., "Automatic Acquisition of Hyponyms from Large Text Corpora," Retrieved Mar. 25, 2011 at <<http://acl.ldc.upenn.edu/C/C92/C92-2082.pdf >>, In Proceedings of the 14th International Conference on Computational Linguistics (COLING-92), 1992, pp. 539-545.

Hulth, A., "Improved Automatic Keyword Extraction Given More Linguistic Knowledge," Retrieved Mar. 25, 2011 at <<http://acl.ldc.upenn.edu/acl2003/emnlp/pdf/Hulth.pdf >>, In Proceedings of the 2003 conference on Empirical methods in natural language processing (EMNLP'03), 2003, pp. 216-223.

Isard, M., et al., "Dryad: Distributed Data-Parallel Programs from Sequential Building Blocks," Retrieved Mar. 25, 2011 at <<http://research.microsoft.com/en-us/projects/dryad/eurosys07.pdf >>, In Proceedings of the 2nd ACM SIGOPS/EuroSys European Conference on Computer Systems (EuroSys'07), Mar. 21-23, 2007, Lisboa, Portugal EuroSys, 2007, pp. 59-72.

Krestel, R., et al., "Latent Dirichlet Allocation for Tag Recommendation," Retrieved Mar. 25, 2011 at <<http://www.l3s.de/web/upload/documents/1/recSys09.pdf >>, Proceedings of the Third ACM Conference on Recommender Systems (RecSys'09), Oct. 23-25, 2009, pp. 61-68.

Kumar, R., et al., "A Characterization of Online Search Behavior," Retrieved Mar. 25, 2011 at <<http://citeseerx.ist.psu.edu/viewdoc/download?doi=10.1.1.161.3605&rep=rep1&type=pdf >>, IEEE Data Eng. Bull., 32(2), 2009, pp. 3-11.

"MapReduce," Retrieved Sep. 12, 2011 at <<http://en.wikipedia.org/wiki/MapReduce>>, Wikipedia, 9 pages.

Mishne, G., "Autotag: A Collaborative Approach to Automated Tag Assignment for Weblog Posts," Retrieved Mar. 25, 2011 at <<http://staff.science.uva.nl/~gilad/pubs/www2006-blogtags.pdf >>, In Proceedings of the 15th International Conference on World Wide Web (WWW '06), May 22-26, 2006, Edinburgh, Scotland, pp. 953-954.

Rendle, S., et al., "Learning Optimal Ranking with Tensor Factorization for Tag Recommendation," Retrieved Sep. 28, 2011 at <<http://citeseerx.ist.psu.edu/viewdoc/download?doi=10.1.1.165.8224&rep=rep1&type=pdf >>, In Proceedings of the 15th ACM SIGKDD International Conference on Knowledge Discovery and Data Mining (KDD'09), Jun. 28-Jul. 1, 2009, pp. 727-736.

Sigurbjörnsson, B., et al., "Flickr Tag Recommendation Based on Collective Knowledge," Retrieved Sep. 28, 2011 at <<http://www2008.org/papers/pdf/p327-sigurbjornssonA.pdf>>, In Proceeding of the 17th International Conference on World Wide Web (WWW '08), Apr. 21-25, 2008, Beijing, China, pp. 327-336.

Song, Y., et al., "Real-Time Automatic Tag Recommendation," Retrieved Mar. 25, 2011 at <<http://grads.ist.psu.edu/zzhuang/docs/sigir08_tagging.pdf>>, In Proceedings of the 31st Annual International ACM SIGIR Conference on Research and Development in Information Retrieval (SIGIR'08), Jul. 20-24, 2008, Singapore, pp. 515-522.

Sood, S. C., et al., "TagAssist: Automatic Tag Suggestion for Blog Posts," Retrieved Mar. 25, 2011 at <<http://citeseerx.ist.psu.edu/viewdoc/download?doi=10.1.1.119.6350&rep=rep1&type=pdf >>, In Proc. of ICWSM 200,7 Boulder, Colorado, USA, 7 pages.

Suchanek, F. M., et al., "Yago: A Core of Semantic Knowledge Unifying WordNet and Wikipedia," Retrieved Mar. 25, 2011 at <<http://www2007.org/papers/paper391.pdf >>, In Proceedings of

(56) References Cited

OTHER PUBLICATIONS the 16th International Conference on World Wide Web (WWW '07), May 8-12, 2007, Banff, Alberta, Canada, pp. 697-706.

Suchanek, F. M., et al., "Social Tags: Meaning and Suggestions," Retrieved Mar. 25, 2011 at <<http://suchanek.name/work/publications/cikm2008.pdf>>, In Proceedings of the 17th ACM Conference on Information and Knowledge Management (CIKM '08), Oct. 26-30, 2008, Napa Valley, California, pp. 223-232.

Witten, I. H., et al., "Kea: Practical Automatic Keyphrase Extraction," Retrieved Mar. 25, 2011 at <<http://www.cs.waikato.ac.nz/~ihw/papers/04-IHW-GWP-etal-KEAPractical.pdf >>, ACM Conference on Digital Libraries, 1999, 23 pages.

\* cited by examiner

200b

(2A)
↓

---
214 — The description indicators include one or more attributes associated with one or more entities that represent instances of items included in the first domain (2B)
↓

216 — Initiate the analysis of the plurality of documents to identify occurrences of mentions of the obtained entity indicator and contexts associated with each of the occurrences of the mentions in each one of the plurality of documents, based on identifying co-occurrences of the mentions of the obtained entity indicator within a proximity window in text included in each one of the plurality of documents (2C)
↓

218 — Determine a measure of fitness associated with the description tag association based on a goodness of fit value (2D)
↓

220 — Determine proximities of the description indicators to the occurrences of mentions of the obtained entity indicator, based on a number of tokens between each of the description indicators and occurrences of mentions of the obtained entity indicator (2E)
↓

222 — Determine whether one or more of the plurality of documents includes a significant percentage of text that is focused on one or more mentions of the obtained entity indicator

```
┌─────────────────────────────────────────────────────────────────┐ 232
│ Generate the inverted index based on the one or more name variants │
│ associated with the obtained entity indicator, based on prefix filtering │
│                                                                 │
└─────────────────────────────────────────────────────────────────┘
```

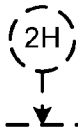

```
┌─────────────────────────────────────────────────────────────────┐ 234
│ Generate the inverted index based on the one or more name variants │
│ associated with the obtained entity indicator, based on individual token │
│ inverted index entries, or tokenset inverted index entries       │
└─────────────────────────────────────────────────────────────────┘
```

FIG. 2d

TAGGING ENTITIES WITH DESCRIPTIVE PHRASES

BACKGROUND

Searching databases has become a routine functionality that may be used many times each day by users of devices such as desktop computers, personal computers and handheld devices such as mobile phones and global positioning system (GPS) devices. Many searches may be based on a user's desire to find items that satisfy specific descriptive criteria. For example, a user may be planning a snorkeling or scuba diving trip, and may wish to purchase a rugged, water-resistant camera and/or watch for the trip. If the user performs an Internet search, for example, for rugged, water-resistant cameras, he/she may not want to spend time looking through text of retrieved web documents that merely contain the words "rugged" or "water-resistant" and "camera" somewhere on a retrieved page, to attempt to find one or more cameras that satisfy their need.

SUMMARY

According to one general aspect, a descriptive phrase association engine may include an etag collector configured to obtain a plurality of description indicators associated with a first domain. The descriptive phrase association engine may also include an entity receiving component configured to obtain an entity indicator associated with the first domain. The descriptive phrase association engine may also include a context determination component configured to initiate an analysis of a plurality of documents to identify occurrences of mentions of the obtained entity indicator and contexts associated with each of the occurrences of the mentions in each one of the plurality of documents. The descriptive phrase association engine may also include a proximity determination component configured to determine proximities of the description indicators to the occurrences of mentions of the obtained entity indicator, for each one of the plurality of documents that includes one or more of the description indicators and one or more occurrences of mentions of the obtained entity indicator, based on the obtained contexts. The descriptive phrase association engine may also include an etag association component configured to generate a description tag association between the obtained entity indicator and one of the description indicators, based on the determined proximities.

According to another aspect, a plurality of description phrases associated with a first domain may be determined, based on an analysis of a first plurality of documents. An entity associated with the first domain may be obtained. An analysis of a second plurality of documents may be initiated to identify occurrences of mentions of the obtained entity and contexts associated with each of the occurrences of the mentions in each one of the second plurality of documents. A description tag association between the obtained entity and one of the description phrases may be generated, based on the identified occurrences of mentions of the obtained entity and contexts associated with each of the occurrences of the mentions.

According to another aspect, a computer program product tangibly embodied on a computer-readable medium may include executable code that is configured to cause at least one data processing apparatus to determine a plurality of description phrases associated with a first domain, based on an analysis of a first plurality of documents to determine co-occurrences of the description phrases with one or more name labels associated with the first domain. Further, the data processing apparatus may obtain an entity associated with the first domain. Further, the data processing apparatus may initiate an analysis of a second plurality of documents to identify co-occurrences of mentions of the obtained entity and one or more of the plurality of description phrases, and contexts associated with each of the co-occurrences of the mentions and description phrases, in each one of the second plurality of documents. Further, the data processing apparatus may determine a description tag association between the obtained entity and one of the description phrases, based on an analysis of the identified contexts.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

Many online searches are performed using descriptive phrases instead of exact name keywords. For example, a user may wish to find a product by searching on attributes they find desirable about the product, instead of entering an exact name of a product (e.g., they may be trying to find products that have the attributes, and may wish to discover names of products having the desired attributes).

Example techniques discussed herein may be used, for example, to provide etags, or descriptive phrases, that may be associated with entities of a domain (e.g., cameras, watches) so that searching on the descriptive phrases may provide results that are relevant for the user queries.

For one or more named entities from a specific domain, example techniques discussed herein may automatically associate descriptive phrases, referred to as etags, to each entity. For example, for a product catalog containing product names and possibly short descriptions, and for a specific product, such as RICOH G600 Digital Camera, example techniques discussed herein may associate etags such as "water resistant", "rugged" and "outdoor" to it, even though its name or description does not mention those phrases. For example, such tagging may enable more effective search over entities.

According to example embodiments, a two-step architecture may provide discovery of tags in a first step and associate tags to entities in a second step. According to an example embodiment, techniques discussed herein may use lexical patterns to obtain high quality tags for a given category of entities (e.g. tags for cameras domain, tags for watches domain, tags for shirts domain).

According to example embodiments, techniques discussed herein may provide entity mention identification in documents that is robust to variations in mentions of the entities of a domain.

According to example embodiments, techniques discussed herein may generate associations between entities and tags based on contexts of entity mentions.

Figure 1:
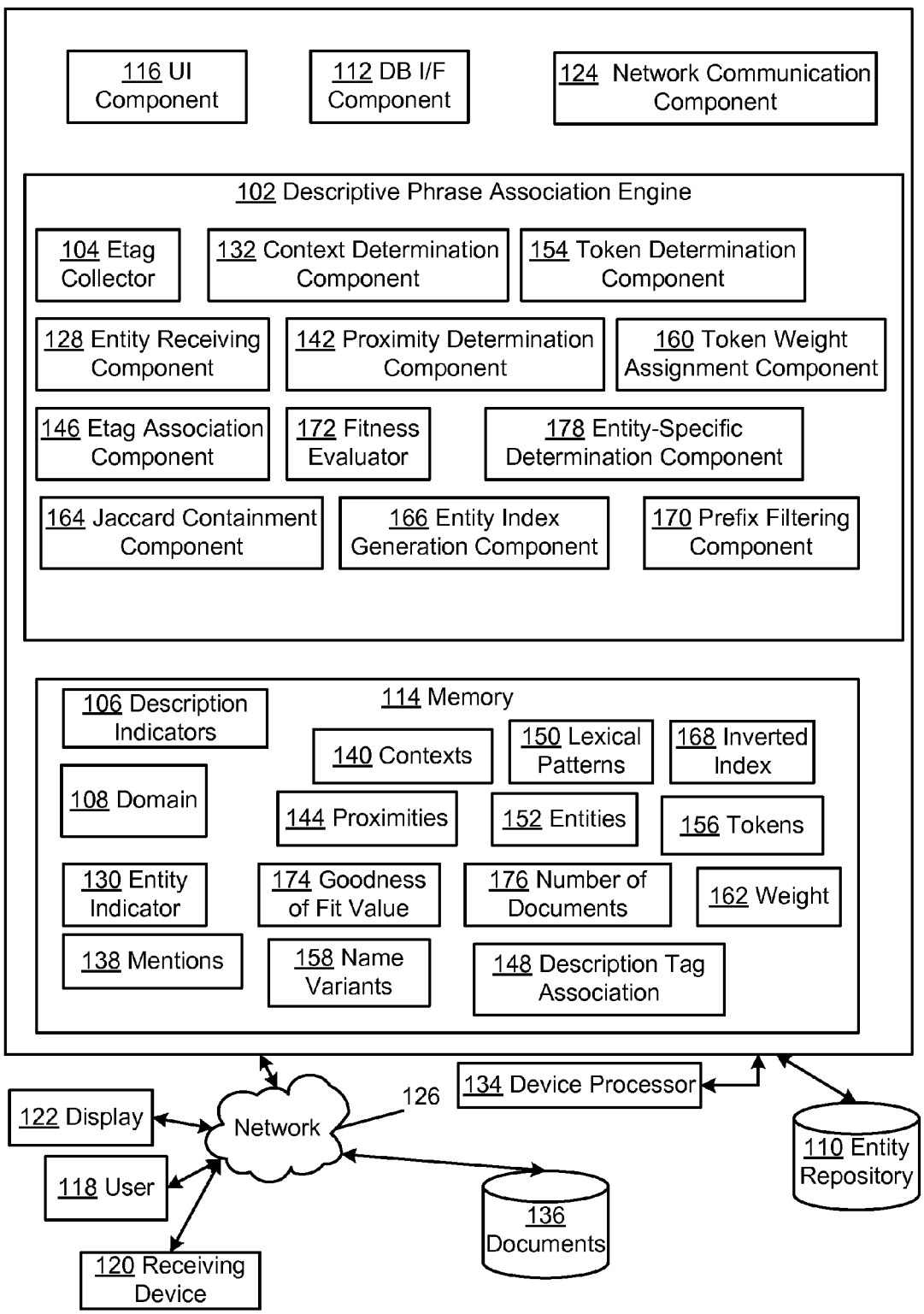
FIG. 1 is a block diagram of an example system for associating entities with descriptive phrases.

As further discussed herein, FIG. 1 is a block diagram of a system 100 for associating entities with descriptive phrases. As shown in FIG. 1, a descriptive phrase association engine 102 may include an etag collector 104 that may be configured to obtain a plurality of description indicators 106 associated with a first domain 108.

According to example embodiments, the descriptive phrase association engine 102 may include executable instructions that may be stored on a computer-readable storage medium, as discussed below. According to example embodiments, the computer-readable storage medium may include any number of storage devices, and any number of storage media types, including distributed devices.

According to example embodiments, an entity repository 110 may include one or more databases, and may be accessed via a database interface component 112. One skilled in the art of data processing will appreciate that there are many techniques for storing repository information discussed herein, such as various types of database configurations (e.g., SQL SERVERS) and non-database configurations.

According to an example embodiment, the descriptive phrase association engine 102 may include a memory 114 that may store the description indicators 106 associated with the first domain 108. In this context, a "memory" may include a single memory device or multiple memory devices configured to store data and/or instructions. Further, the memory 114 may span multiple distributed storage devices.

According to an example embodiment, a user interface component 116 may manage communications between a user 1118 and the descriptive phrase association engine 102. The user 118 may be associated with a receiving device 120 that may be associated with a display 122 and other input/output devices. For example, the display 122 may be configured to communicate with the receiving device 120, via internal device bus communications, or via at least one network connection. According to an example embodiment, the display 122 may provide a visual, audio, and/or tactile medium for the user 118 (e.g., a system administrator) to monitor his/her input to and responses from the descriptive phrase association engine 102. For example, the user 118 may provide input via a touchpad, a touchscreen, a keyboard or keypad, a mouse device, a trackball device, or an audio input device or other input sensing device. For example, the user 118 may speak information for voice recognition processing to character format.

According to an example embodiment, the descriptive phrase association engine 102 may include a network communication component 124 that may manage network communication between the descriptive phrase association engine 102 and other entities that may communicate with the descriptive phrase association engine 102 via at least one network 126. For example, the at least one network 126 may include at least one of the Internet, at least one wireless network, or at least one wired network. For example, the at least one network 126 may include a cellular network, a radio network, or any type of network that may support transmission of data for the descriptive phrase association engine 102. For example, the network communication component 124 may manage network communications between the descriptive phrase association engine 102 and the receiving device 120. For example, the network communication component 124 may manage network communication between the user interface component 116 and the receiving device 120.

An entity receiving component 128 may be configured to obtain an entity indicator 130 associated with the first domain 108.

A context determination component 132 may be configured to initiate, via a device processor 134, an analysis of a plurality of documents 136 to identify occurrences of mentions 138 of the obtained entity indicator 130 and contexts 140 associated with each of the occurrences of the mentions 138 in each one of the plurality of documents 136.

In this context, a "processor" may include a single processor or multiple processors configured to process instructions associated with a processing system. A processor may thus include multiple processors processing instructions in parallel and/or in a distributed manner. Although the device processor 134 is depicted as external to the descriptive phrase association engine 102 in FIG. 1, one skilled in the art of data processing will appreciate that the device processor 134 may be implemented as a single component, and/or as distributed units which may be located internally or externally to the descriptive phrase association engine 102, and/or any of its elements.

A proximity determination component 142 may be configured to determine proximities 144 of the description indicators 106 to the occurrences of mentions 138 of the obtained entity indicator 130, for each one of the plurality of documents 136 that includes one or more of the description indicators 106 and one or more occurrences of mentions 138 of the obtained entity indicator 130, based on the obtained contexts 140.

An etag association component 146 may be configured to generate a description tag association 148 between the obtained entity indicator 130 and one of the description indicators 106, based on the determined proximities 144.

According to an example embodiment, the etag collector 104 may be configured to obtain the plurality of description indicators 106 associated with the first domain 108 based on determining the description indicators 106 based on lexical patterns 150 that include one of the description indicators 106 and a name associated with the first domain 108.

According to an example embodiment, the description indicators 106 may include one or more attributes associated with one or more entities 152 that represent instances of items included in the first domain 108.

According to an example embodiment, a token determination component 154 may be configured to determine one or more tokens 156 associated with the obtained entity indicator 130, the one or more tokens 156 included in one or more name variants 158 associated with the obtained entity indicator 130.

According to an example embodiment, a token weight assignment component 160 may be configured to assign a weight 162 to each respective one of the tokens 156 associated with the obtained entity indicator 130.

According to an example embodiment, the context determination component 132 may be configured to initiate the analysis of the plurality of documents 136 to identify occurrences of mentions 138 of the obtained entity indicator 130 and contexts 140 associated with each of the occurrences of the mentions 138 in each one of the plurality of documents 136, the identification of the mentions 138 based on an analysis of Jaccard containment of subsequences of tokens included in a set of web documents, via a MapReduce platform. For example, the analysis of Jaccard containment may be performed via a Jaccard containment component 164, as discussed further below.

In this context, "MapReduce" may refer to a framework for processing very large datasets on various distributable problems using a large number of computers (e.g., nodes), which may collectively be referred to as a cluster (e.g., if all nodes use the same hardware) or as a grid (e.g., if the nodes use different hardware). For example, in a "map" step, a master node may receive input, partition it into smaller sub-problems, and distribute those to worker nodes. A worker node may partition this again in turn, yielding a multi-level tree structure. The worker node may process the smaller problem, and pass the answer back to its master node.

For example, in a "reduce" step, the master node may then obtain the answers to all the sub-problems and combine them to generate an output, e.g., the answer to the problem it was originally trying to solve.

For example, MapReduce may provide distributed processing of the map and reduction operations. Provided that each mapping operation is independent of the others, the map operations may be performed in parallel. Similarly, a set of "reducers" may perform the reduction step.

According to an example embodiment, an entity index generation component 166 may be configured to generate an inverted index 168 based on the one or more name variants 158 associated with the obtained entity indicator 130.

According to an example embodiment, identifying occurrences of mentions 138 of the obtained entity indicator 130 may be based on accessing the inverted index 168.

According to an example embodiment, the entity index generation component 166 may be configured to generate the inverted index 168 based on the one or more name variants 158 associated with the obtained entity indicator 130, based on prefix filtering. For example, a prefix filtering component 170 may be configured to perform the prefix filtering, as discussed further below.

According to an example embodiment, the entity index generation component 166 may be configured to generate the inverted index 168 based on the one or more name variants 158 associated with the obtained entity indicator 130, based on individual token inverted index entries, or tokenset inverted index entries.

According to an example embodiment, the context determination component 132 may be configured to initiate the analysis of the plurality of documents 136 to identify occurrences of mentions 138 of the obtained entity indicator 130 and contexts 140 associated with each of the occurrences of the mentions 138 in each one of the plurality of documents 136, based on identifying co-occurrences of the mentions 138 of the obtained entity indicator 130 within a proximity window in text included in each one of the plurality of documents 136.

According to an example embodiment, a fitness evaluator 172 may be configured to determine a measure of fitness associated with the description tag association 148 based on a goodness of fit value of 174, determined in accordance with Equation (1):

$$G\text{-test} = 2O(e, t)\ln\left(\frac{O(e, t)}{E(e, t)}\right) + 2(N_w - O(e, t))\ln\left(\frac{N_{N_w} - O(e, t)}{N_w - E(e, t)}\right) \approx \quad (1)$$

$$2O(e, t)\ln\left(\frac{O(e, t)}{E(e, t)}\right),$$

wherein $\mathcal{W}$ represents a set of web documents, $\mathcal{N}_\mathcal{W}$ represents a number of documents 176 in the set $\mathcal{W}$, e represents one of the entity mentions, t represents one of the description indicators, O(e, t) indicates a number of documents in the set $\mathcal{W}$ that include both t and e, and E(e, t) represents an expected co-occurrence frequency, indicated as $$E(e, t) = \frac{Freq(e)}{N_{N_w}} \frac{Freq(t)}{N_w} N_w = \frac{Freq(e)Freq(t)}{N_w},$$

wherein

Freq(e) represents a number of documents in the set $\mathcal{W}$ wherein a e is identified, and Freq(t) represents a number of documents in the set $\mathcal{W}$ wherein t is identified.

According to an example embodiment, the proximity determination component 142 may be configured to determine proximities 144 of the description indicators 106 to the occurrences of mentions 138 of the obtained entity indicator 130, based on a number of tokens between each of the description indicators 106 and occurrences of mentions 138 of the obtained entity indicator 130.

According to an example embodiment, an entity-specific determination component 178 may be configured to determine whether one or more of the plurality of documents 136 includes a significant percentage of text that is focused on one or more mentions 138 of the obtained entity indicator 130.

Figure 2A:
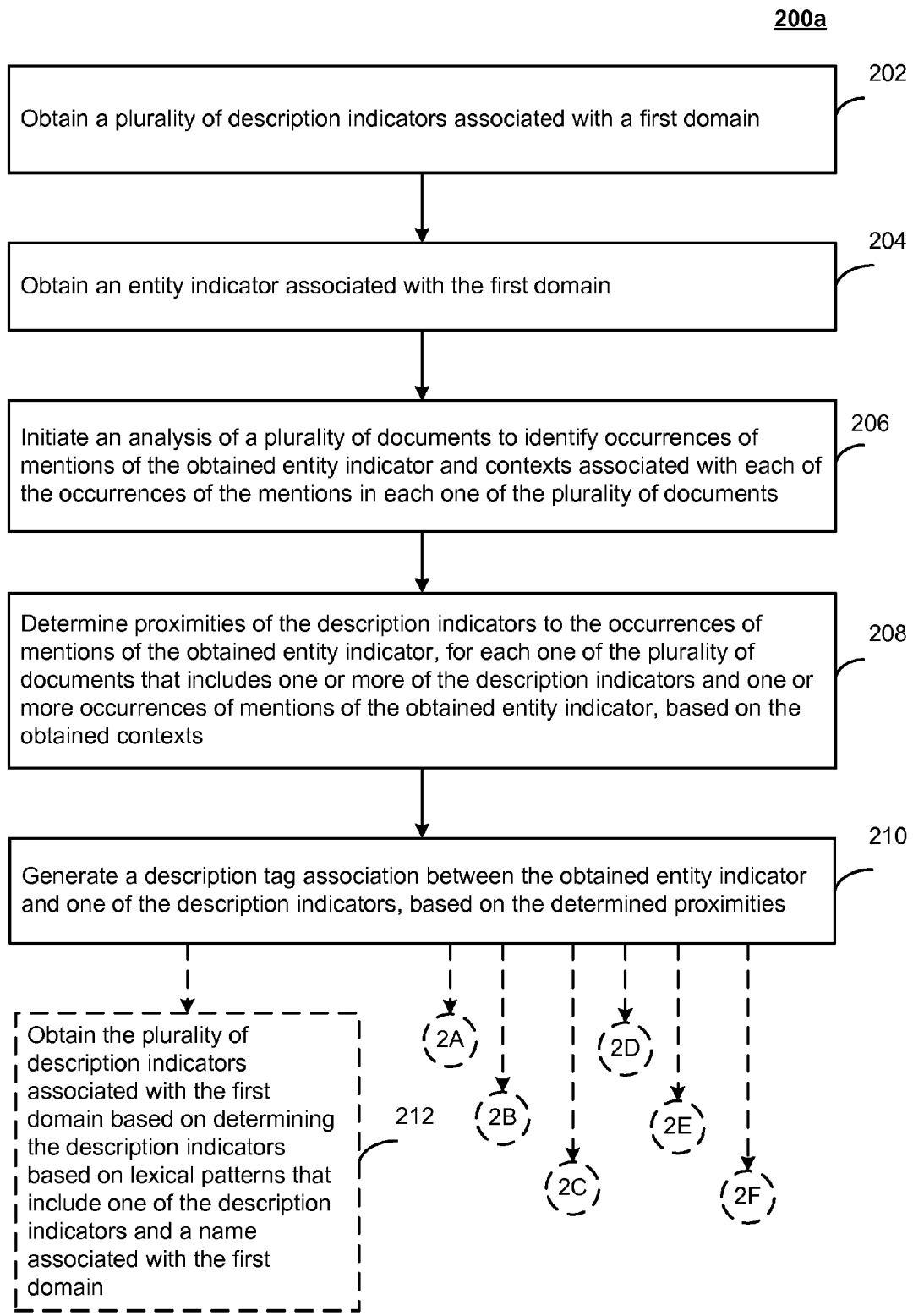
FIG. 2 is a flowchart illustrating example operations of the system of FIG. 1.
Figure 2C:
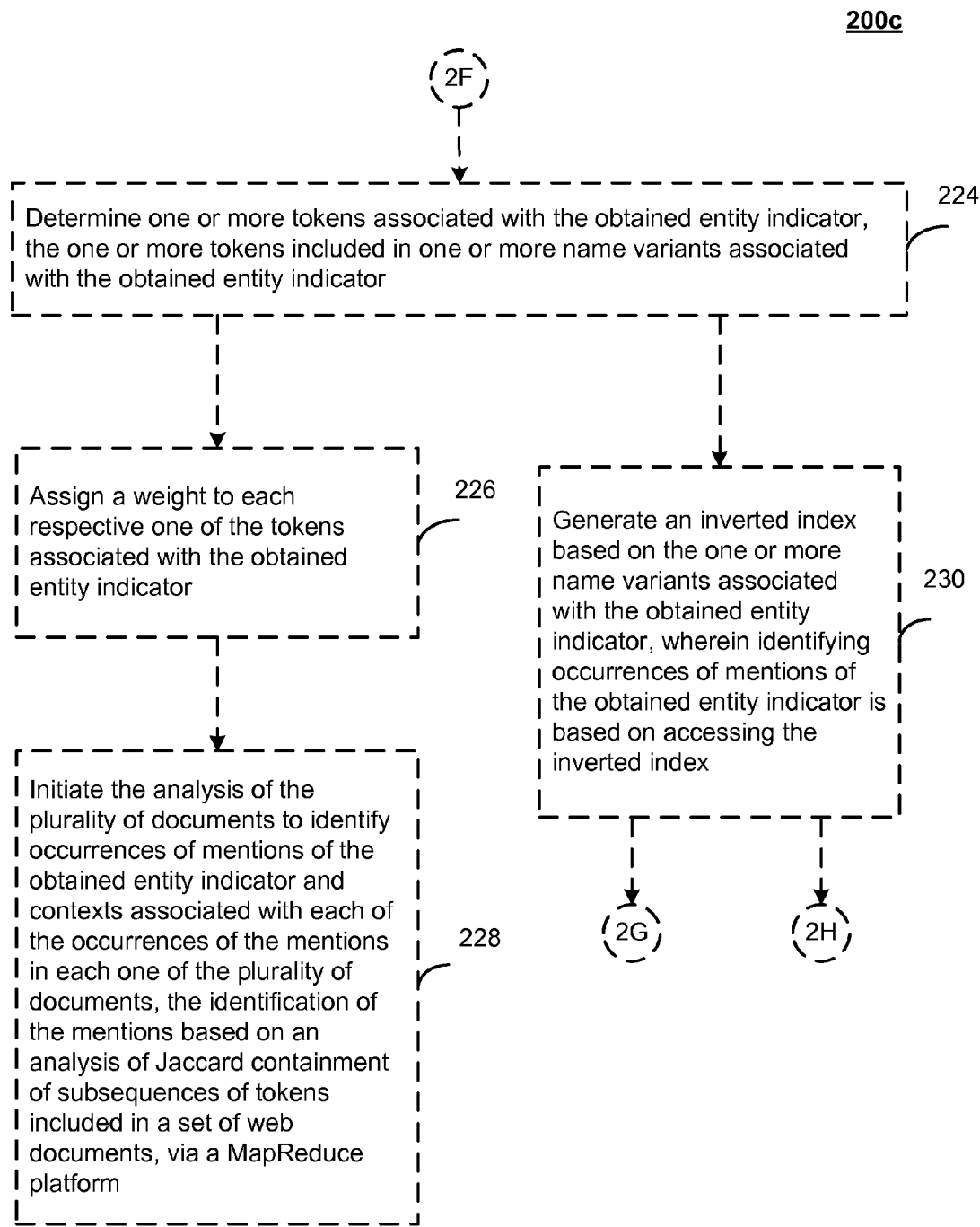

FIG. 2 is a flowchart 200 illustrating example operations of the system of FIG. 1. In the example of FIG. 2, a plurality of description indicators associated with a first domain may be obtained (202). For example, the etag collector 104 may obtain a plurality of description indicators 106 associated with a first domain 108, as discussed above.

An entity indicator associated with the first domain may be obtained (204). For example, the entity receiving component 128 may obtain an entity indicator 130 associated with the first domain 108, as discussed above.

An analysis of a plurality of documents may be initiated to identify occurrences of mentions of the obtained entity indicator and contexts associated with each of the occurrences of the mentions in each one of the plurality of documents (206). For example, the context determination component 132 may initiate, via the device processor 134, an analysis of a plurality of documents 136 to identify occurrences of mentions 138 of the obtained entity indicator 130 and contexts 140 associated with each of the occurrences of the mentions 138 in each one of the plurality of documents 136, as discussed above.

Proximities of the description indicators to the occurrences of mentions of the obtained entity indicator may be determined, for each one of the plurality of documents that includes one or more of the description indicators and one or more occurrences of mentions of the obtained entity indicator, based on the obtained contexts (208). For example, the proximity determination component 142 may determine proximities 144 of the description indicators 106 to the occurrences of mentions 138 of the obtained entity indicator 130, for each one of the plurality of documents 136 that includes one or more of the description indicators 106 and one or more occurrences of mentions 138 of the obtained entity indicator 130, based on the obtained contexts 140, as discussed above.

A description tag association between the obtained entity indicator and one of the description indicators may be generated, based on the determined proximities (210). For example, the etag association component 146 may generate a description tag association 148 between the obtained entity indicator 130 and one of the description indicators 106, based on the determined proximities 144, as discussed above.

According to an example embodiment, the plurality of description indicators associated with the first domain may be obtained based on determining the description indicators based on lexical patterns that include one of the description indicators and a name associated with the first domain (212). For example, the etag collector 104 may obtain the plurality of description indicators 106 associated with the first domain 108 based on determining the description indicators 106 based on lexical patterns 150 that include one of the description indicators 106 and a name associated with the first domain 108, as discussed above.

According to an example embodiment, the description indicators may include one or more attributes associated with one or more entities that represent instances of items included in the first domain (214).

According to an example embodiment, the analysis of the plurality of documents may be initiated to identify occurrences of mentions of the obtained entity indicator and contexts associated with each of the occurrences of the mentions in each one of the plurality of documents, based on identifying co-occurrences of the mentions of the obtained entity indicator within a proximity window in text included in each one of the plurality of documents (216). For example, the context determination component 132 may initiate the analysis of the plurality of documents 136 to identify occurrences of mentions 138 of the obtained entity indicator 130 and contexts 140 associated with each of the occurrences of the mentions 138 in each one of the plurality of documents 136, based on identifying co-occurrences of the mentions 138 of the obtained entity indicator 130 within a proximity window in text included in each one of the plurality of documents 136, as discussed above.

According to an example embodiment, a measure of fitness associated with the description tag association may be determined based on a goodness of fit value (218). For example, the fitness evaluator 172 may determine a measure of fitness associated with the description tag association 148 based on a goodness of fit value 174, as discussed above. For example, the measure of fitness may be determined in accordance with a G-test function value, as discussed further below.

According to an example embodiment, proximities of the description indicators to the occurrences of mentions of the obtained entity indicator may be determined, based on a number of tokens between each of the description indicators and occurrences of mentions of the obtained entity indicator (220). For example, the proximity determination component 142 may determine proximities 144 of the description indicators 106 to the occurrences of mentions 138 of the obtained entity indicator 130, based on a number of tokens between each of the description indicators 106 and occurrences of mentions 138 of the obtained entity indicator 130, as discussed above.

According to an example embodiment, it may be determined whether one or more of the plurality of documents includes a significant percentage of text that is focused on one or more mentions of the obtained entity indicator (222). For example, the entity-specific determination component 178 may be configured to determine whether one or more of the plurality of documents 136 includes a significant percentage of text that is focused on one or more mentions 138 of the obtained entity indicator 130, as discussed above.

According to an example embodiment, one or more tokens associated with the obtained entity indicator may be determined, the one or more tokens included in one or more name variants associated with the obtained entity indicator (224). For example, the token determination component 154 may determine one or more tokens 156 associated with the obtained entity indicator 130, the one or more tokens 156 included in one or more name variants 158 associated with the obtained entity indicator 130, as discussed above.

According to an example embodiment, a weight may be assigned to each respective one of the tokens associated with the obtained entity (226). For example, the token weight assignment component 160 may assign a weight 162 to each respective one of the tokens 156 associated with the obtained entity indicator 130, as discussed above.

According to an example embodiment, the analysis of the plurality of documents may be initiated to identify occurrences of mentions of the obtained entity indicator and contexts associated with each of the occurrences of the mentions in each one of the plurality of documents, the identification of the mentions based on an analysis of Jaccard containment of subsequences of tokens included in a set of web documents, via a MapReduce platform (228). For example, the context determination component 132 may initiate the analysis of the plurality of documents 136 to identify occurrences of mentions 138 of the obtained entity indicator 130 and contexts 140 associated with each of the occurrences of the mentions 138 in each one of the plurality of documents 136, the identification of the mentions 138 based on an analysis of Jaccard containment of subsequences of tokens included in a set of web documents, via a MapReduce platform, as discussed above.

According to an example embodiment, an inverted index may be generated based on the one or more name variants associated with the obtained entity indicator, wherein identifying occurrences of mentions of the obtained entity indicator may be based on accessing the inverted index (230). For example, the entity index generation component 166 may generate an inverted index 168 based on the one or more name variants 158 associated with the obtained entity indicator 130, as discussed above.

According to an example embodiment, the inverted index may be generated based on the one or more name variants associated with the obtained entity indicator, based on prefix filtering (232). For example, the entity index generation component 166 may generate the inverted index 168 based on the one or more name variants 158 associated with the obtained entity indicator 130, based on prefix filtering, as discussed above.

According to an example embodiment, the inverted index may be generated based on the one or more name variants associated with the obtained entity indicator, based on individual token inverted index entries, or tokenset inverted index entries (234). For example, the entity index generation component 166 may generate the inverted index 168 based on the one or more name variants 158 associated with the obtained entity indicator 130, based on individual token inverted index entries, or tokenset inverted index entries, as discussed above.

Figure 3:
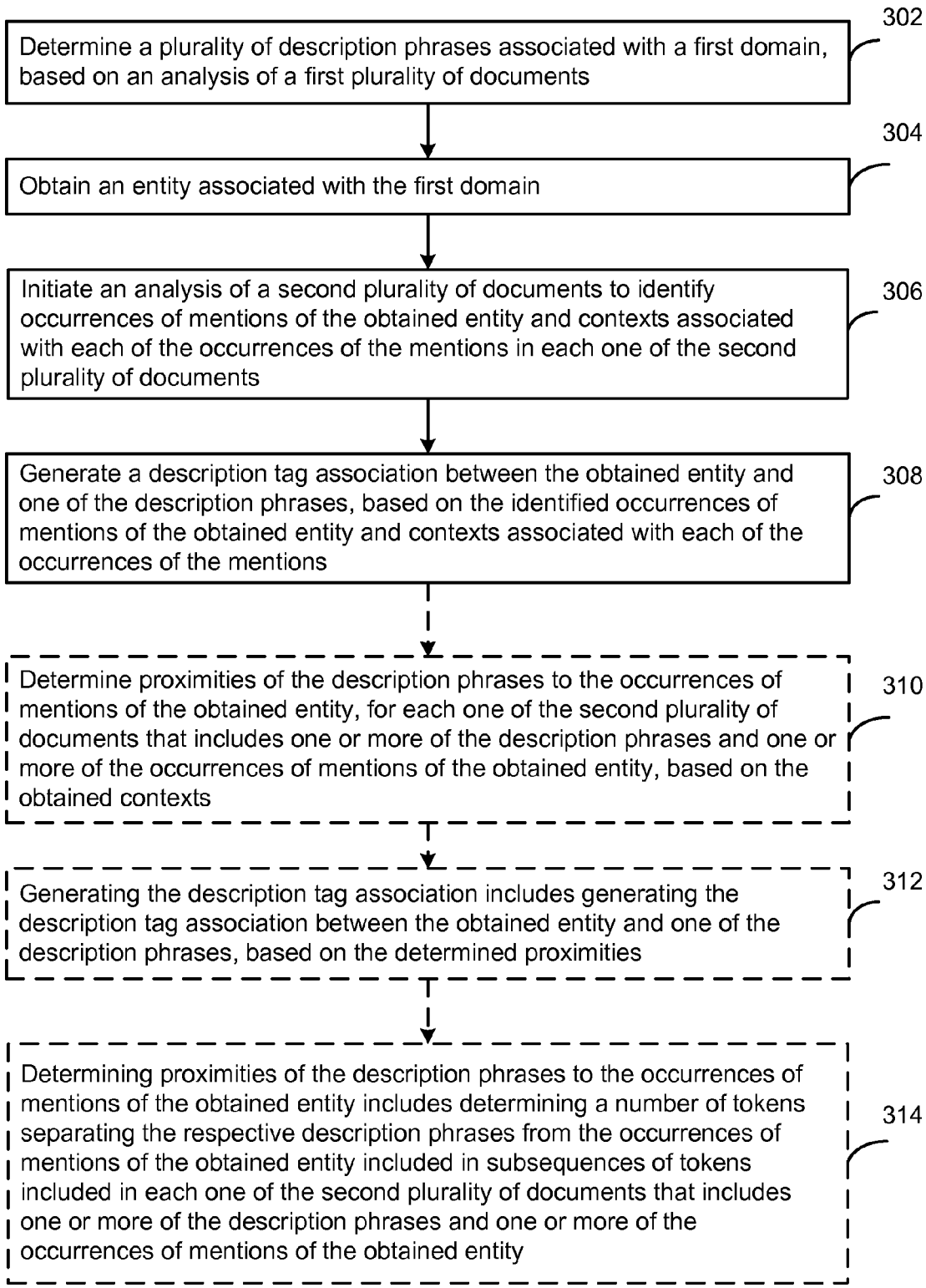
FIG. 3 is a flowchart illustrating example operations of the system of FIG. 1.

FIG. 3 is a flowchart 300 illustrating example operations of the system of FIG. 1. In the example of FIG. 3, a plurality of description phrases associated with a first domain may be determined, based on an analysis of a first plurality of documents (302). For example, the etag collector 104 may obtain a plurality of description indicators 106 associated with a first domain 108, as discussed above.

An entity associated with the first domain may be obtained (304). For example, the entity receiving component 128 may obtain an entity 152 associated with the first domain 108.

An analysis of a second plurality of documents may be initiated to identify occurrences of mentions of the obtained entity and contexts associated with each of the occurrences of the mentions in each one of the second plurality of documents (306). For example, the context determination component 132 may initiate an analysis of a plurality of documents 136 to identify occurrences of mentions 138 of the obtained entity indicator 130 and contexts 140 associated with each of the occurrences of the mentions 138 in each one of the plurality of documents 136.

A description tag association between the obtained entity and one of the description phrases may be generated, based on the identified occurrences of mentions of the obtained entity and contexts associated with each of the occurrences of the mentions (308). For example, the etag association component 146 may be configured to generate a description tag association 148 between the obtained entity indicator 130 and one of the description indicators 106, based on the identified occurrences of mentions 138 of the obtained entity 152 and contexts 140 associated with each of the occurrences of the mentions 138.

According to an example embodiment, proximities of the description phrases to the occurrences of mentions of the obtained entity may be determined, for each one of the second plurality of documents that includes one or more of the description phrases and one or more of the occurrences of mentions of the obtained entity, based on the obtained contexts (310). For example, the proximity determination component 142 may determine proximities 144 of the description indicators 106 to the occurrences of mentions 138 of the obtained entity indicator 130, for each one of the plurality of documents 136 that includes one or more of the description phrases and one or more occurrences of mentions 138 of the obtained entity 152, based on the obtained contexts 140, as discussed above.

According to an example embodiment, generating the description tag association may include generating the description tag association between the obtained entity and one of the description phrases, based on the determined proximities (312). For example, the etag association component 146 may generate a description tag association 148 between the obtained entity 152 and one of the description phrases, based on the determined proximities 144.

According to an example embodiment, determining proximities of the description phrases to the occurrences of mentions of the obtained entity may include determining a number of tokens separating the respective description phrases from the occurrences of mentions of the obtained entity included in subsequences of tokens included in each one of the second plurality of documents that includes one or more of the description phrases and one or more of the occurrences of mentions of the obtained entity (314).

Figure 4A:
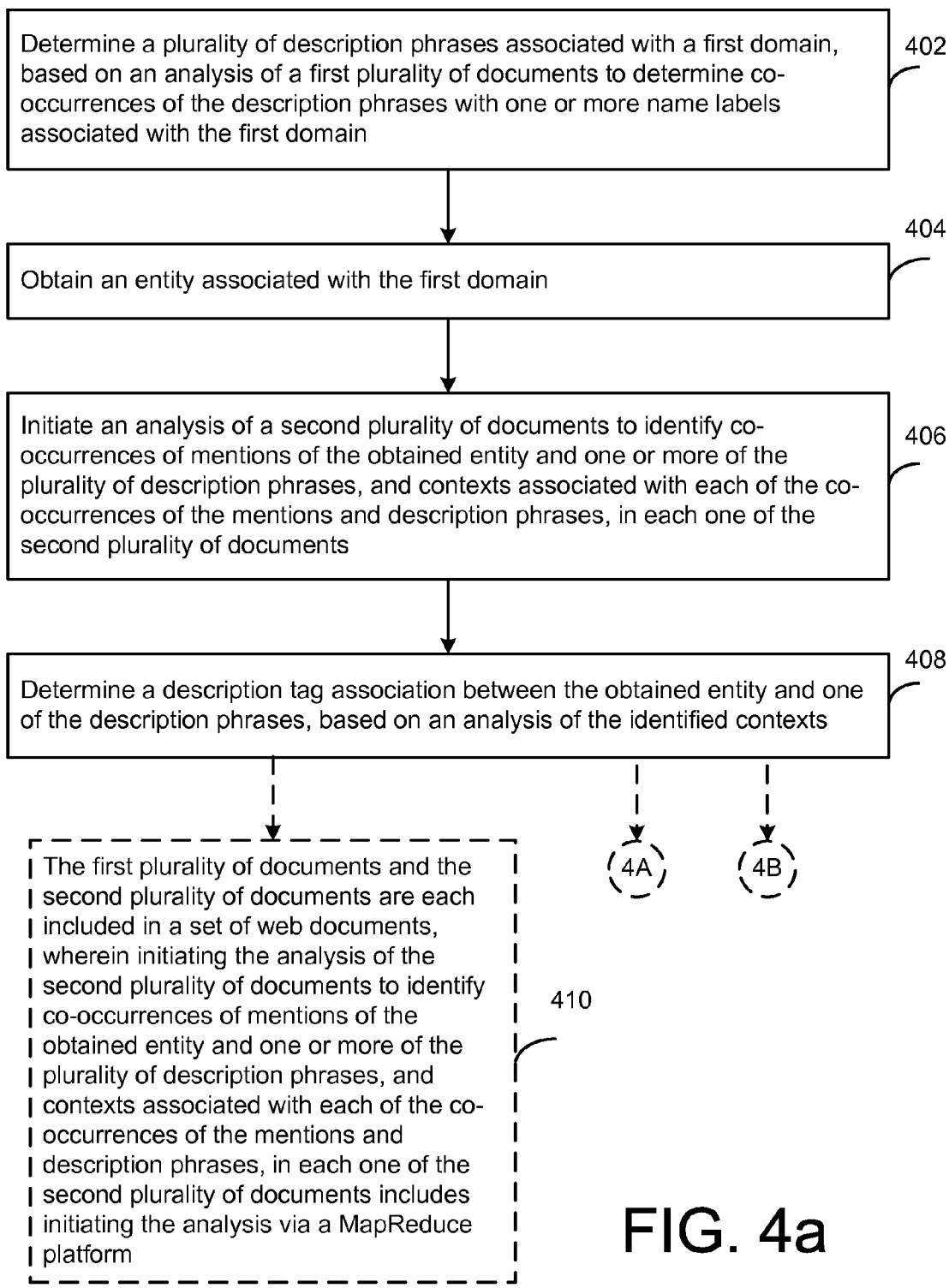
FIG. 4 is a flowchart illustrating example operations of the system of FIG. 1.
Figure 4B:
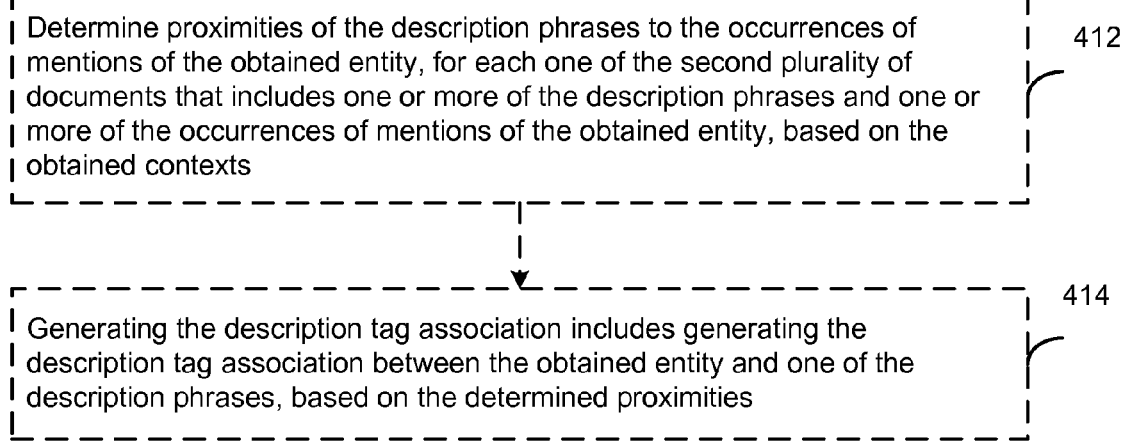
Figure 4B:
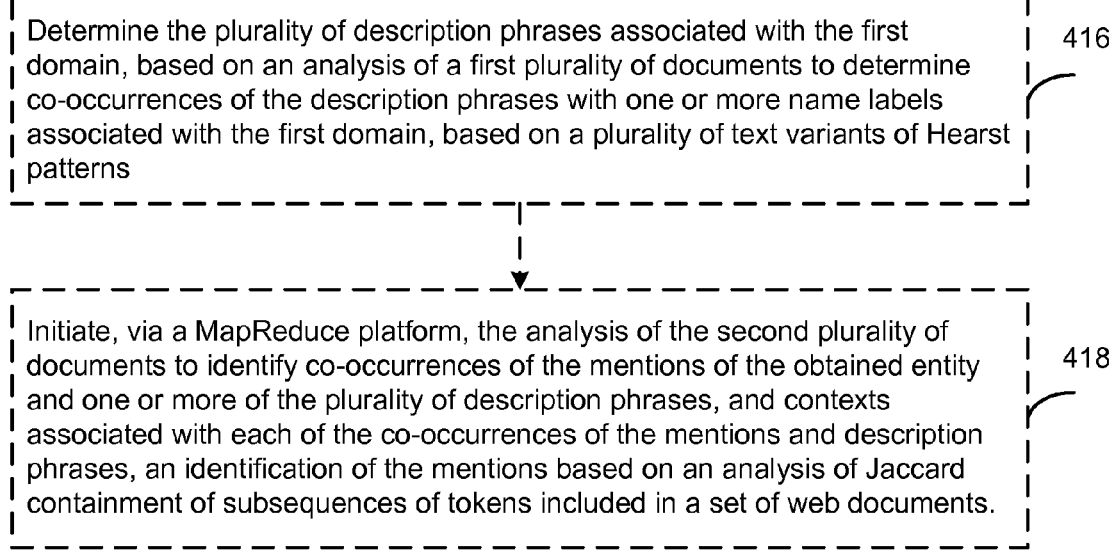

FIG. 4 is a flowchart 400 illustrating example operations of the system of FIG. 1. In the example of FIG. 4, a plurality of description phrases associated with a first domain may be determined, based on an analysis of a first plurality of documents to determine co-occurrences of the description phrases with one or more name labels associated with the first domain (402). For example, the etag collector 104 may obtain a plurality of description phrases associated with the first domain 108.

An entity associated with the first domain may be obtained (404). For example, the entity receiving component 128 may obtain an entity 152 associated with the first domain 108.

An analysis of a second plurality of documents may be initiated to identify co-occurrences of mentions of the obtained entity and one or more of the plurality of description phrases, and contexts associated with each of the co-occurrences of the mentions and description phrases, in each one of the second plurality of documents (406). For example, the context determination component 132 may initiate an analysis of a plurality of documents 136 to identify co-occurrences of mentions 138 of the obtained entity 152 and one or more of the plurality of description phrases, and contexts 140 associated with each of the co-occurrences of the mentions 138 and description phrases, in each one of the second plurality of documents 136.

A description tag association between the obtained entity and one of the description phrases may be determined, based on an analysis of the identified contexts (408). For example, the etag association component 146 may generate a description tag association 148 between the obtained entity indicator 130 and one of the description phrases.

According to an example embodiment, the first plurality of documents and the second plurality of documents may each be included in a set of web documents, wherein initiating the analysis of the second plurality of documents to identify co-occurrences of mentions of the obtained entity and one or more of the plurality of description phrases, and contexts associated with each of the co-occurrences of the mentions and description phrases, in each one of the second plurality of documents may include initiating the analysis via a MapReduce platform (410).

According to an example embodiment, proximities of the description phrases to the occurrences of mentions of the obtained entity may be determined, for each one of the second plurality of documents that includes one or more of the description phrases and one or more of the occurrences of mentions of the obtained entity, based on the obtained contexts (412). According to an example embodiment, generating the description tag association may include generating the description tag association between the obtained entity and one of the description phrases, based on the determined proximities (414).

According to an example embodiment, the plurality of description phrases associated with the first domain may be determined, based on an analysis of a first plurality of documents to determine co-occurrences of the description phrases with one or more name labels associated with the first domain, based on a plurality of text variants of Hearst patterns (416).

According to an example embodiment, the analysis of the second plurality of documents may be initiated, via a MapReduce platform, to identify co-occurrences of the mentions of the obtained entity and one or more of the plurality of description phrases, and contexts associated with each of the co-occurrences of the mentions and description phrases, an identification of the mentions based on an analysis of Jaccard containment of subsequences of tokens included in a set of web documents (418).

According to example embodiments, "entity tagging" may refer to automatically associating descriptive phrases, referred to as etags, to each entity, for one or more named entities from a specific domain. For example, a product catalog may include product names and short descriptions associated with the respective products. For example, a user may wish to associate etags such as "water resistant", "rugged" and "outdoor" to a product such as a RICOH G600 Digital Camera, even though its name or description does not mention those phrases. Entity tagging may thus enable more effective search over entities.

According to example embodiments, example techniques discussed herein may leverage signals in web documents to perform such tagging. According to example embodiments, example techniques discussed herein may perform the tagging in a domain independent manner while ensuring high precision and high recall.

Example techniques discussed herein may utilize a two-step architecture that includes a combination of lexical patterns and large scale, co-occurrence analysis over web documents to associate etags to entities, which may provide higher recall without sacrificing precision. For example, the MapReduce framework may be used to scalably perform such analyses over billions of web documents.

Many applications may perform searches over named entities (or "entities"). Examples of such applications may include vertical search engines such as product search and local search engines. For example, when a user submits a query to a product search engine, it may obtain the relevant entities by searching over the information in the product catalog. While many queries may include names of specific products (e.g., the query [RICOH g600]), many queries may also search for products based on desired attribute values. Example queries in the camera domain may include [underwater disposable camera], [rugged camera] and [point and shoot camera]. In this context, such queries may be referred to as "attribute-value queries". A recent study has reported that approximately 42% of all product queries are attribute-value queries.

For attribute-value queries, searches over a product catalog may often miss relevant results, as the attributes that are searched on may not be included in the catalog. For example, many product catalogs may include the name, technical specifications and possibly a short description of each product.

For example, a user may wish to submit a query [rugged camera]. RICOH G600 Digital Camera may be a rugged camera but the name, technical specifications or short description may not mention the desired attribute. Thus, search over the above catalog may fail to return this relevant product. However, if descriptive phrases may be assigned to entities (such as assigning "rugged", "outdoor" and "water resistant" to RICOH G600 Digital Camera) and if the product catalog may be augmented with the descriptive phrases (or description phrases), search over the catalog may be able to answer such attribute-value queries more effectively.

Many users manually annotate items such as images, videos and internet bookmarks with phrases to enable browsing and search in Web 2.0 sites (e.g., FlICKR). However, such tags in Web 2.0 systems are typically free-form and have no fixed semantics.

According to example embodiments, techniques discussed herein may utilize a class of tags that describe attributes of entities (e.g., "rugged", "outdoor" and "water resistant" for the entity RICOH G600 Digital Camera). In this context, such tags may be referred to as "entity tags" or "etags". For example, such tags may be helpful in answering attribute-value queries. Further, as discussed herein, such tags may be automatically identified via domain-independent techniques with high quality instead of the manual tagging as utilized in Web 2.0 sites.

Many different resources (e.g., web documents) may be utilized to generate entity tags, including reviews, blogs and expert advice sites that include information regarding entities of interest to vertical search engines. Example techniques discussed herein may derive sufficiently robust signals from these resources to identify such tags automatically.

For example, a large collection of facts may be extracted from the web in an autonomous and domain-independent manner, as discussed in O. Etzioni et al., "Web-scale Information Extraction in Knowitall", In WWW Conference, 2004. For example, the KNOWITALL system may use a set of domain-independent lexical patterns to extract "instance of" relationships from web documents. For example, for the pattern "NP1 such as NPList2" where NP1 is a noun phrase and NPList2 is a list of noun phrases, the KNOWITALL system may indicate that each noun phrase in NPList2 is an instance of the class named in NP1. For example, KNOWITALL may extract three instances of the class "country" from the phrase "countries such as X, Y, and Z" where X, Y and Z are names of countries. In this context, these patterns may be referred to as Hearst patterns, as discussed further in M. A. Hearst, "Automatic Acquisition of Hyponyms from Large Text Corpora," In Proceedings of the 14th International Conference on Computational Linguistics, 1992, pp. 539-545.

However, such patterns may not easily be directly applied to obtain the descriptive phrases for entities (e.g., to discover "rugged" for RICOH G600 Digital Camera) as they are very different in nature from "instance-of" relationships.

Example techniques discussed herein may identify text variants including modifications to the Hearst patterns that make them suitable for extraction of tags for entities. As discussed further below, these text variants of Hearst patterns (modified Hearst patterns) may provide high precision for identifying tags for entities. According to an example embodiment, examples of such modified Hearst patterns for the camera domain may include "t cameras such as NPList2", "NP1 {,} and other t cameras" and "NP1 is a t camera".

However, use of modified Hearst patterns may provide high precision, while providing unacceptable recall for many entity domains including products, as the patterns may be restrictive. For example, if there are 50 rugged cameras in existence, it may be unlikely that all 50 will occur in such patterns on the web. For many entity domains, information regarding entities may be presented in a variety of forms, such as bullets, lists, and tables. Furthermore, the patterns may include co-references to the entities rather than the entities themselves.

For example, text fragments such as "RICOH G600 digital camera is recently announced. . . . It is a water resistant camera. . . . " may occur in one or more web documents. It may be difficult to associate the tag "water resistant" to the entity RICOH G600 digital camera using a small number of lexical patterns. However, experimental results have indicated that a small fraction of valid entity-etag pairs may occur in such patterns.

According to example techniques discussed herein, a two-step process that decouples etag discovery from etag association may provide high recall while maintaining high precision. For example, in a first step, robust lexical patterns may be identified that may attempt to discover tags without reference to any specific entities, which may provide a larger set of etags without sacrificing precision. According to an example embodiment, once the etags have been obtained, a second step in the two-step process may utilize a "text proximity" based technique to identify candidate (entity, tag) associations, without further using the lexical patterns. According to an example embodiment, spurious candidates may be eliminated by ensuring that the association includes sufficient "support" among web documents. Such a two step technique may provide higher recall while the aggregation of evidences across several documents may also provide high precision.

According to example techniques discussed herein, mentions of the entities may be identified in web documents, and the discovered etags may then be associated with the entities. For example, the entity mentions may be scalably identified via a MapReduce framework, as discussed further herein.

According to example techniques discussed herein, statistical techniques (e.g., based on G-tests for goodness-of-fit) may be used to associate etags to entities. For example, textual proximity between entities and etags may be determined and evidences across all web documents may be aggregated to provide acceptable levels of precision and recall.

Empirical evaluations have been performed on two entity domains (cameras and shirts) that have different characteristics. The empirical evaluations have indicated that techniques discussed herein may provide 85% precision while discovering a significant number of etags per entity. Further, example techniques discussed herein may scale favorably, as both etag discovery and entity-etag association may be determined on high static rank web documents on MapReduce clusters in 3-4 hours.

One skilled in the art of data processing will appreciate that example techniques discussed herein may also be used to tag entities of domains other than product entities, without departing from the spirit of the discussion herein.

As an example problem statement, $\mathcal{D}$ may denote a domain of entities. For example, $\mathcal{D}$ may denote a domain of cameras, or a domain of shirts. Further, in text documents, each entity domain may be denoted by one or more alternative strings. For example, $\mathcal{N}_\mathcal{D}$ may denote a set of strings used to denote $\mathcal{D}$. For example, for a camera domain, $\mathcal{N}_{camera}$ may be {"camera"}. As another example, for a laptop domain, $\mathcal{N}_{laptop}$={"laptop", "notebook", "laptop computer", "notebook computer"}. According to an example embodiment, this input may be obtained from a domain expert.

According to an example embodiment, each entity to be tagged may also be associated with a string such that a canonical string may be used to refer to the entity. For example, the entity RICOH G600 Digital Camera may be referenced by the string "RICOH G600 Digital Camera".

More formally, an "entity tagging problem" may be indicated as determining etags associated with each entity $e \in \mathcal{E}$, wherein set $\mathcal{N}_\mathcal{D}$ represents a set of strings used to denote an entity domain $\mathcal{D}$, and $\mathcal{W}$ represents a set of documents (e.g., web documents) and one or more entities $\mathcal{E}$ belonging to domain $\mathcal{D}$.

Figure 5:
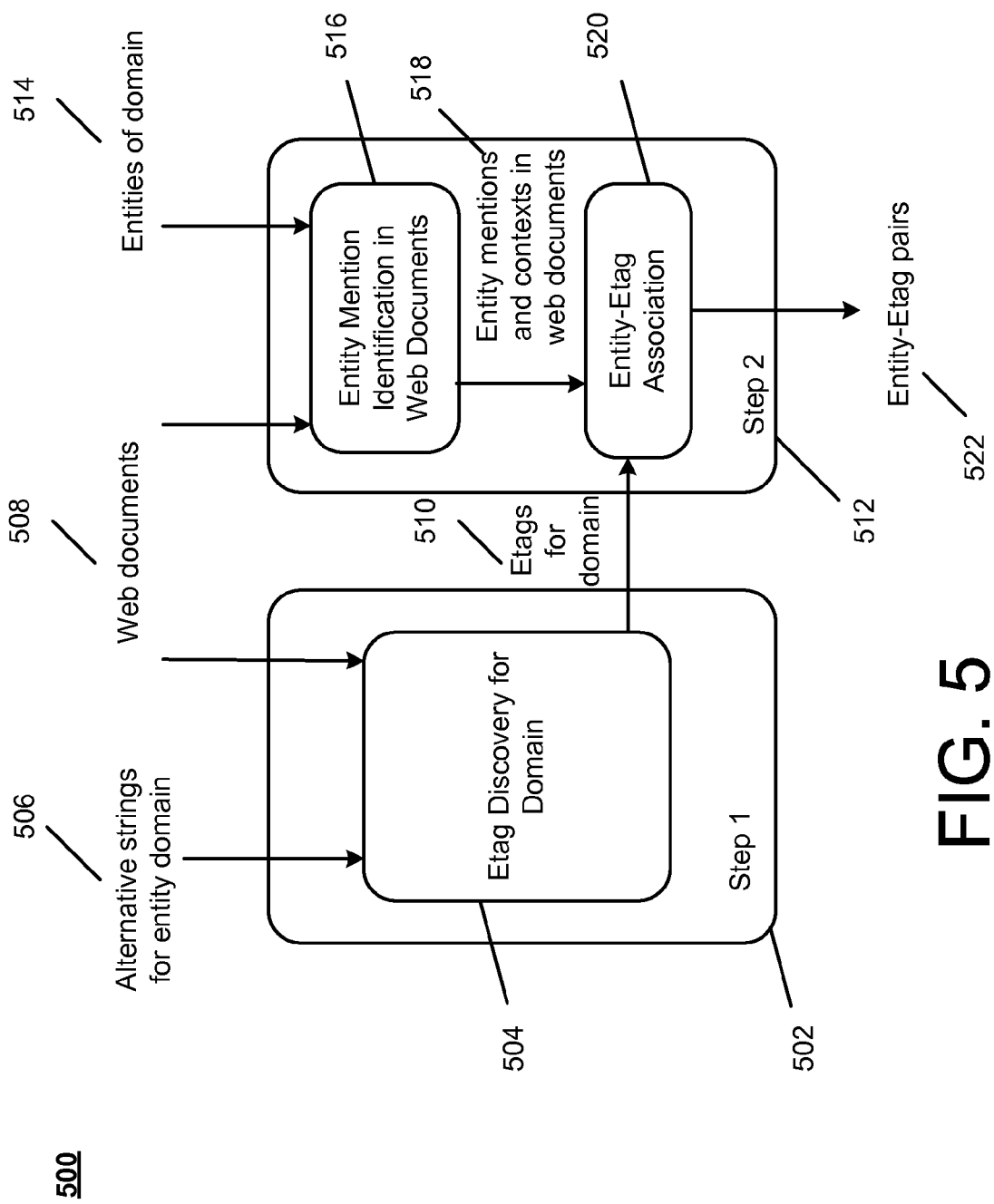
FIG. 5 is a block diagram of an example system for associating entities with descriptive phrases.

FIG. 5 is a block diagram of an example system 500 for associating entities with descriptive phrases. For example, the system 500 may be included in a descriptive phrase association engine 102 discussed above.

As shown in FIG. 5, an EntityTagger system 500 may include a two-step framework, as discussed further below.

According to an example embodiment, an Etag Discovery step 502 may include a first software component 504. As shown in FIG. 5, a set $\mathcal{N}_\mathcal{D}$ of alternative names 506 may be used to denote the entity domain $\mathcal{D}$, and may be utilized with a set $\mathcal{W}$ of web documents 508 to determine the etags 510 ($\mathcal{T}_\mathcal{D}$) for the entity domain $\mathcal{D}$. As discussed further below, lexical patterns may be extracted from a large set of web documents.

According to an example embodiment, an Entity-Etag Association step 512 may include obtaining the set $\mathcal{T}_\mathcal{D}$ of etags 510 for a domain (e.g., the etags as discovered in the Etag Discovery step 502) and a set $\mathcal{E}$ of entities 514 included in the entity domain $\mathcal{D}$, so that an etag $t \in \mathcal{T}_\mathcal{D}$ may be associated to an entity $e \in \mathcal{E}$ if t is a valid etag for e, (i.e., t is a descriptive phrase for e). Since the association may be based on text proximity between entities and etags, it may be desirable to identify 516 where the entities in $\mathcal{E}$ are mentioned in web documents (e.g., as entity mentions). Subsequently, the contexts of the entity mentions 518 may be analyzed to determine which entity-tag pairs appear in close proximity of each other.

Thus, according to an example embodiment, an Entity Mention Identification in Web Documents component 516 may obtain the set $\mathcal{E}$ of entities 514 included in domain $\mathcal{D}$ and the set $\mathcal{W}$ of web documents 508, to identify the mentions of those entities 514 in those web documents 508. According to an example embodiment, approximate mentions may be identified, and the techniques discussed herein may be scaled to billions of web documents.

An alternative may include using a search engine Application Programming Interface (API) instead of identifying entity mentions in web documents. For example, the entity string may be provided as the query to search for etags in the snippets, titles and URLs returned by the search engine. However, this alternative may not scale: for a large set of entities, this technique may consume significant computation time. Retrieving the body of the documents may be significantly slower and may be determined as infeasible for many environments. Further, the amount of context information may be small: snippets are small and many APIs may have a bound on the number of hits returned, adversely affecting the quality of entity-tag association. Further, the semantics of entity mentions for this technique may provide an unacceptable quality of association.

According to an example embodiment, an Entity-Etag Association component 520 may use contexts for determining the associations. For example, the Entity-Etag Association component 520 may obtain the set 510 $\mathcal{T}_\mathcal{D}$ of etags for a domain and the mentions of entities 518 in $\mathcal{E}$ and their contexts in web documents, to associate an etag $t \in \mathcal{T}_\mathcal{D}$ to an entity $e \in \mathcal{E}$ if t is a valid etag for e. According to an example embodiment, the associations may be provided as entity-etag pairs 522.

Another alternative may include identifying occurrences of the etags and then searching for entity mentions in the context of those occurrences. For many domains, the etags may include commonly occurring terms (e.g., "cheap", "light", "small", "large"). In such cases, occurrences of entities may be more selective than occurrences of etags. However, it may be more efficient to evaluate the more selective condition first. According to an example embodiment, an EntityTagger technique discussed herein may adopt the former alternative.

According to an example embodiment, a MapReduce framework may be utilized to scalably analyze billions of web documents for entity tagging. For example, a snapshot of the web may already exist in an example MapReduce platform. For example, search engine companies such as GOOGLE, MICROSOFT and YAHOO! may provide such snapshots, as well as other publicly available snapshots (e.g., the CLUEWEB09 dataset).

Theoretically, an idealized environment may provide a complete ontology of a given domain. However, in more realistic environments, the etags may include labels of the subclasses (i.e., a hyponym that is not an instance) of the root node (i.e., the node that corresponds to the entire domain). For example, for the camera domain, "rugged" may be considered an etag, as "rugged cameras" is a subclass in a complete ontology for cameras.

For example, WORDNET has 11 subclasses for the camera domain. However, this information exists in textual form in web documents. Thus, a user may wish to determine the etags from web documents with high accuracy. For example, lexical patterns, such as Hearst patterns, may be used to determine "instance of" relationships from web documents.

As discussed above, these patterns may be modified to determine valid entity-etag pairs with acceptable levels of precision. For example, for the camera domain, the phrase t may be assigned to an entity e if the pattern "t $n_\mathcal{D}$ such as NPList2" occurs in web documents where $n_\mathcal{D} \in \mathcal{N}_\mathcal{D}$ and "t $n_\mathcal{D}$" is a noun phrase.

Other modified patterns such as "NP1 {,} and other t cameras" and "NP1 is a t camera" may be used similarly. However, as discussed above, this technique may provide unacceptable levels of recall.

According to an example embodiment, etags for a domain may be determined based on is generating the union of the etags in the entity-etag pairs determined by the example techniques discussed above. Since those entity-etag pairs may be acceptably accurate, the etags generated may also be acceptably accurate.

However, this example technique may miss many valid etags for the domain, as the technique utilizes a comprehensive set of entities of the domain in order to obtain a comprehensive set of etags for the domain (and such a set may not be available), and as co-references of the entity (instead of the entity itself) may occur in the patterns. For example, for a fragment of a web document such as "RICOH G600 is recently announced . . . It is a water resistant camera", the example technique discussed above may miss the etag "water resistant" in the above fragment even if it uses a comprehensive set of entities.

According to an example embodiment, the lexical patterns may be modified such that they retain the acceptable accuracy of the previous patterns but produce significantly more etags. Since a goal includes discovering only etags without associating them to an entity, the absence of an entity in the pattern may be acceptable, whereas the absence of an entity in the pattern may be unacceptable for the previous approach, for associating the tag with that entity. For example, for the camera domain, patterns may be searched such as "t cameras such as", "and other t camera" and "is a t camera" instead of "t cameras such as entityList", "entity and other t cameras" and "entity is a t camera".

More formally, a phrase t may be an etag for the domain $\mathcal{D}$ iff one of the following patterns occur $\delta$ or more times in $\mathcal{W}$:

(a) "is a t$n_\mathcal{D}$";
(b) "is an t$n_\mathcal{D}$";
(c) "t $n_\mathcal{D}$ such as";
(d) "and other t$n_\mathcal{D}$";
(e) "or other t$n_\mathcal{D}$";
(f) "t $n_\mathcal{D}$ including"; or
(g) "t $n_\mathcal{D}$ especially" where $n_\mathcal{D} \in \mathcal{N}_\mathcal{D}$, "t $n_\mathcal{D}$" is a noun phrase and $\delta$ is an application specified threshold ($\delta \geq 1$).

The predefined threshold $\delta$ may be used to eliminate noise. For example, EntityTagger may use $\delta=5$.

The above modification may provide significantly higher numbers of etags compared with the union approach discussed above, without sacrificing precision. The above modification addresses both the limitations of the union approach: (i) it may be used without a comprehensive set of entities (e.g., it may be used with no entities), and (ii) it may extract tags even when the pattern includes one or more co-references to the entity rather than the actual entity.

According to an example embodiment, etag discovery from web documents may be performed efficiently using the MapReduce framework. For example, the lexical patterns may be extracted and the etags may be identified from each document independently; hence, these operations may be efficiently executed in parallel using a MapReduce framework. For example, a map step may search for the lexical patterns in each document and, for each pattern found, may provide the key-value pair <t, 1>, where t denotes the etag in the pattern.

According to an example embodiment, lexical patterns may be searched by first detecting occurrences of strings in $\mathcal{N}_\mathcal{D}$ in the web document (e.g., using a multi-string matching algorithm such as an Aho-Corasick algorithm). For example, the remaining portion of the lexical pattern may be searched in the left/right of those occurrences. According to an example embodiment, a reduce step may sum up the input values to obtain the number of occurrences of each etag. According to an example embodiment, etags that occur less than $\delta$ times in web documents may be filtered out.

According to an example embodiment, a goal of the Entity Mention Identification in Web Documents component 516 may include identifying the mentions of a set of entities in a set of documents (e.g., all web documents). One skilled in the art of data processing will understand that the example techniques discussed herein may provide many applications beyond entity tagging.

According to an example embodiment, mentions of unambiguous entities may be identified, i.e., entities for which the occurrence of the corresponding string in a document unambiguously refers to the particular entity. For example, the entity RICOH G600 Digital Camera may be unambiguous, while the entity Pretty Woman (the movie) may be ambiguous. Many entities in the product domain may be unambiguous entities. According to an example embodiment, ambiguous entities may be identified by first identifying the mentions of the entity string and then eliminating the non-references by running it through a classifier.

In many scenarios, e.g., in scenarios involving products, when users mention an entity in a document, the mention may (i) omit one or more tokens (ii) add a few extra tokens and (iii) order the tokens differently compared with that in the entity name in a reference table. For example, users may refer to the entity RICOH G600 Digital Camera as "G600 10 mp camera from RICOH". In this scenario, "digital" is omitted, "10 mp" and "from" are extra tokens, and the tokens have a different order in the mention. Exact string matching may miss many of the mentions for such domain. Thus, identifying approximate mentions may be helpful for entity tagging.

According to an example embodiment, a set of "synonyms" may be identified for each entity. Each synonym for entity e may include an identifying set of tokens, which when mentioned contiguously in a document, may refer to e. For example, "RICOH G600" and "G600 Camera" may be identified as synonyms of RICOH G600 Digital Camera. According to an example embodiment, the reference set may be expanded with the identified synonyms to determine exact occurrences of the expanded set of strings in documents. However, this example technique may miss many of the mentions. For example, this example technique may not identify the mention "G600 10 mp camera from RICOH" discussed above.

In accordance with example techniques discussed herein, a definition of entity mention may be provided that is robust to all the three types of variations. According to an example embodiment, each entity may be modeled as a set of tokens. According to an example embodiment, the set of tokens for an entity may be derived by tokenizing its string using a set of delimiters (which may include white spaces and punctuation symbols). For example, the entity RICOH G600 Digital Camera may be modeled by the set {RICOH, G600, Digital, Camera}. According to an example embodiment, weights may be associated to the tokens to indicate an "importance" value of tokens.

For example, inverse document frequency on the web may be used to associate a more significant weight to rarer tokens (e.g., model names) and a less significant weight to more frequent tokens (e.g., stop words). The weight of a set s of tokens, denoted by wt(s), is the sum of the weights of its tokens.

According to an example embodiment, Jaccard containment of a set $s_1$ in another set $s_2$ may be used in example techniques discussed herein. More formally, for two sets $s_1$ and $s_2$, the Jaccard containment of $s_1$ in $s_2$, denoted by JaccCont($s_1$, $s_2$) may be determined as $wt(s_1 \cap s_2)/wt(s_1)$.

For example, for two sets $s_1$={RICOH, G600, Digital, Camera} and $s_2$={G600, 10 mp, camera, from, RICOH}, with all tokens having unit weight, the Jaccard containment of $s_1$ in $s_2$ may be determined as JaccCont($s_1$, $s_2$)=0.75.

According to an example embodiment, each document may be modeled as a sequence of tokens. Similarly to entities, the sequence may be derived by tokenizing the document using a set of delimiters (which may include white spaces and punctuation symbols). Intuitively, a subsequence s of tokens in a document may be a mention of an entity e iff (i) most of the "important" tokens in e also occur in s, i.e., JaccCont(e, set(s)) is high (for simplicity herein, e may also refer to the set of tokens in e), (ii) s does not contain an unacceptable number of extra tokens, i.e., $|e \cap set(s)|/|set(s)|$ is high where set(s) denotes the set of tokens in s, and (iii) s is minimal, i.e., there are no extraneous tokens at the two ends.

More formally, a subsequence s of tokens included in a document may be referred to as an "entity mention" or "mention" of e iff (i) JaccCont(e, set(s))≥θ (ii) $|e \cap set(s)|/|set(s)|$≥β and (iii) for any subsequence s' of s, JaccCont(e, set(s'))<JaccCont(e, set(s)).

For example, for a document that includes the text "RICOH recently announced a new camera: the G600 10 mp camera from RICOH is rugged and water resistant", and for θ=0.7 and β=0.5, the subsequence s="G600 10 mp camera from RICOH" is a mention of the entity e=RICOH G600 Digital Camera, as JaccCont(e, set(s))=0.75, $|e \cap set(s)|/|set(s)|$=0.6 and s is minimal. For example, the subsequence "camera: the G600 10 mp camera from RICOH" is not a mention as it is not minimal (e.g., it violates (iii)). For example, the subsequence "RICOH recently announced a new camera: the G600 10 mp camera" is not a mention either as it includes an unacceptable number of extra tokens (e.g., it violates (ii)).

According to an example embodiment, entity mention identification may involve identifying mentions of all entities in the reference set in a set of documents, such as web documents.

More formally, according to an example embodiment, for a reference set $\mathcal{E}$ of entities and a set $\mathcal{W}$ of web documents, an example Entity Mention Identification technique may determine <d, i, j, e> iff the subsequence of a document d∈$\mathcal{W}$ from the $i^{th}$ token to the $j^{th}$ token is a mention of an entity e∈$\mathcal{E}$.

According to an example embodiment, techniques discussed herein may efficiently identify entity mentions at web scale using an example MapReduce framework. According to an example embodiment, the entity mentions in each web document may be identified independently, and thus the identification may be parallelized using a MapReduce framework. According to an example embodiment, each document may be processed via two steps: (1) candidate generation that may identify subsequences of the documents that may be entity mentions by checking condition (i) in the above discussion of "entity mention" or "mention" of e; and (2) candidate verification that may verify whether the candidate mentions are entity mentions by checking conditions (i), (ii) and (iii) in the above discussion of "entity mention" or "mention" of e. According to an example embodiment, the entities may be indexed to generate the candidates efficiently.

According to an example embodiment, Jaccard containment may be checked via an example prefix filtering technique. For example, for a set r, the prefix filtering technique may sort the tokens in r in decreasing order of weights and determine a shortest prefix such that the sum of the weights of the tokens in the prefix exceeds (1−θ)×wt(r) (e.g., denoted as $prefix_{(1-\theta)}(r)$).

More formally, if JaccCont($s_1$, $s_2$)≥θ, then $prefix_{(1-\theta)}(s_1) \cup s_2 \neq \theta$.

For example, for an entity e={RICOH, G600, Digital, Camera}, with each element having unit weight, and θ=0.6, then, using the order in which the set is listed, $prefix_{0.4}$(e)={RICOH, G600}. This result may imply that if the Jaccard containment of e in a set s is at least 0.6, then s includes either RICOH or G600.

The above result may be used to generate the following inverted index on the reference entities: for each entity e∈$\mathcal{E}$, the identifier of e may be added to the posting list of each token in $prefix_{(1-\theta)}$(e). According to an example embodiment, this index may be broadcast to nodes in the MapReduce cluster, along with an entity reference table. Subsequently, each node may locally process each web document as discussed below.

According to an example embodiment, all subsequences of size α of the document may be generated by sliding a window of size α over the document. For each subsequence s, each token in s may be looked up in the above index, and then the union of their posting lists may be determined. According to an example embodiment, the results may be determined as the candidate entities that may be mentioned within s. According to an example embodiment, the candidate mentions may then be verified by a verification step.

The example candidate generation technique discussed above may generate a very large number of candidates. For example, some tokens may have long posting lists. For example, the token "RICOH" may have all RICOH cameras in its posting list. According to an example embodiment, all these entities may be generated as candidates, thus increasing the number of verifications and the overall cost. In order to alleviate potential unacceptable cost, the entities may be indexed using sets of tokens (e.g., referred to as tokensets) instead of individual tokens. The posting list of a tokenset may then include the documents that include all the tokens in the tokenset, potentially providing shorter posting lists. In this context, such an index may be referred to as a tokenset inverted index. One skilled in the art of data processing will understand that there may exist many choices regarding the tokensets for indexing, as discussed further below.

According to an example embodiment, tokensets may be selected from many variations. According to an example embodiment, the variants of an entity e may be referred to more formally as a collection of minimal subsets of e whose weight is greater than or equal to θ×wt(e).

For example, for the entity e=RICOH G600 Digital Camera, if the weights of the tokens are 5, 9, 1, 3 respectively, and if the threshold θ=0.6, the variants of e include {RICOH, G600} and {G600, Camera}.

For example, a subsequence s in a document may be a mention of e if it includes all the tokens of at least one of the entity variants of e (e.g., following directly from condition (i) in the above discussion of "entity mention" or "mention" of e). Therefore, a two step process may be utilized: all variants of each entity may be generated, and then any tokenset may be selected from each entity variant and the entity for those tokensets may be indexed. Subsequently, for each subsequence s of size α in each document, all subsets of set(s) may be generated and looked up in the index. Similarly to above discussions, the set of candidates may be determined as the union of the posting lists. A verification step may also be performed similarly to above discussions.

This technique may generate significantly fewer candidates, depending on the choice of tokensets for indexing. Considerations for tokenset selection may include: (i) which tokens to include in the tokensets and (ii) what size of the tokensets to select. For consideration (i), the tokens that occur less frequently in web documents may be included.

For consideration (ii), a selection of the size of the tokensets may be balanced by considerations such as smaller tokensets may provide larger numbers of candidates while providing faster candidate generation - while larger tokensets may involve more subsets for generation and lookup during candidate generation, but may provide fewer candidates. According to an example embodiment, tokensets of size 2 or 3 may provide acceptable results.

According to an example embodiment, the above techniques may be implemented via a MapReduce platform, as discussed further below. For example, an EntityTagger technique may first generate a tokenset inverted index using a MapReduce job. For example, the Map step may generate the entity variants for each entity e and, for each variant, may select a tokenset T of size 2 (or 3) and output the key-value pair <T, e>. For example, the Reduce step may then group them by token set and generate the posting lists. The inverted index may then be broadcast to all the cluster nodes.

According to an example embodiment, an EntityTagger technique may also perform mention identification using another MapReduce job. For example, the Map step may move a sliding window of size α over each document, generate the candidates for each window, and verify the candidates. For each valid mention, a tuple <URL, entityid, mention, leftcxt, rightcxt> may be output, where mention refers to mention of the entity in the document and leftcxt and rightcxt refer to the left and right contexts of the mention, respectively. According to an example embodiment, the EntityTagger technique may use a context of length 100 tokens.

According to an example embodiment, the Reduce step may concatenate all the intermediate outputs. In accordance with test results, the MapReduce job discussed above performed entity identification on high static rank pages on the web (approximately 35 TB of data) in 3-4 hours.

As discussed above, adapting Hearst patterns for assigning etags to an entity may provide low recall. As discussed above, all relevant etags for a domain may be obtained and mentions of entities may be identified. As discussed below, the (etag, entity) pairs may be identified, providing high recall without significantly compromising on precision. For example, for the text fragment "RICOH G600 digital camera is recently announced. . . . It is a water resistant camera. . . . ", "water resistant" may be identified as a valid etag using example techniques discussed above. However, it may be difficult to determine that the mention of "It" in the text fragment refers to the entity RICOH G600 Digital Camera (and thus, that the tag "water resistant" may be properly associated to the entity RICOH G600 digital camera). As another example, for many vertical entity domains, information regarding entities may be presented in semistructured forms, such as bullets, lists, and/or tables.

Thus, according to an example embodiment, candidate (etag, entity) pairs may be identified whenever the etag and the entity co-occur within a proximity window in the text. Furthermore, to ensure that spurious instances of such pairs are not generated, co-occurrence frequency analysis may be performed to ensure accuracy. Thus, according to an example embodiment, an etag t may be associated with an entity e, only if they co-occur more than expected.

According to an example embodiment, co-occurrence frequency analysis may be used for associating etags to entities.

More formally, $\mathcal{W}$ may represent a collection of web documents, and $\mathcal{N}_\mathcal{W}$ may represent the number of documents in the collection $\mathcal{W}$. Further, the frequency of an entity e and an etag t in the web document collection $\mathcal{W}$ may be indicated more formally as:

Freq(e)=the number of documents in collection $\mathcal{W}$ wherein mention of entity e is identified, and Freq(t)=the number of documents in collection $\mathcal{W}$ wherein etag t is identified.

The observed co-occurrence frequency may be determined as the actual number of documents in collection $\mathcal{W}$ which include both etag t and entity mention of entity e, indicated as follows in Equation (2) (wherein s refers to an entity mention of entity e in document d):

$$O(e, t) = \Sigma_{d \in W} 1, \text{ subject to } t \subset d, s \subset d \quad (2)$$

This observed co-occurrence frequency is similar to a conventional concept of term frequency (TF) in IR. For example, TF may represent the frequency of term appearance within a document. In contrast, the observed co-occurrence frequency discussed herein may represent the frequency of an etag co-occurring with an entity across many documents.

According to an example embodiment, the expected co-occurrence frequency is the expected number of documents in collection $\mathcal{W}$ which include both etag t and entity mention s of entity e, under a condition that etag t appears independently of entity e. The expected co-occurrence frequency may be indicated as shown in Equation (3):

$$E(e, t) = \frac{Freq(e)}{N_w} \frac{Freq(t)}{N_w} N_w = \frac{Freq(e)Freq(t)}{N_w} \quad (3)$$

According to an example embodiment, the observed co-occurrence frequency may be compared with the expected co-occurrence frequency based on statistical testing using a G-test of goodness-of-fit, as indicated below. The outcome of the test may indicate the significance of difference in determining whether etag t and entity e are positively correlated. According to an example embodiment, a G-test may be indicated as shown in Equation (4):

$$G\text{-test} = 2O(e, t)\ln\left(\frac{O(e, t)}{E(e, t)}\right) + 2(N_w - O(e, t))\ln\left(\frac{N_w - O(e, t)}{N_w - E(e, t)}\right) \approx \quad (4)$$
$$2O(e, t)\ln\left(\frac{O(e, t)}{E(e, t)}\right)$$

Since both O(e, t) and E(e, t) are insignificant when compared to $\mathcal{N}_\mathcal{W}$ under an assumption that an entity and an etag may typically co-occur in a small fraction of documents of the entire corpus $\mathcal{W}$, the second component in the G-test may be neglected as an approximation. Different significance levels may be used as thresholds to the result of a G-test for selecting the associated set of etags for an entity.

According to an example embodiment, proximity information between etag and mentions of entity may also be used for testing the entity-etag association, as discussed further below. For example, the closer an entity e appears in proximity to an etag t in a document, it is intuitively more likely that they are associated. According to an example embodiment, the proximity between an etag and a mention of entity in a document may be determined as the number of tokens between them.

Therefore, rather than counting each entity-etag co-occurrence in a document as indicated in Equation (2), the co-occurrence may be weighted by the proximity between the entity mention and the etag in the document. As a consequence, co-occurrences that appear in closer proximity may be given more weight. For example, a proximity weighting technique as discussed in T. Cheng, et al., "Entityrank: Searching Entities Directly and Holistically", In VLDB '07 Proceedings of the 33rd International Conference on Very Large Data Bases, 2007, pp. 387-398, may be used.

However, noise introduced by other entities in nearby context may cause interference in performing proximity based co-occurrence analyses for entity-etag associations. For example, etags of other entities in close proximity may be incorrectly associated with the target entity, especially in a scenario involving listing pages wherein many entities in the same domain may be mentioned a list (e.g., an EBAY listing page that includes a list of cameras, each with a short description).

According to an example embodiment, only instances of co-occurrence of an entity mention and an etag may be counted, if no other entity in the same domain is mentioned between them. However, this example technique may involve an input of a comprehensive list of entities for a domain. While this scenario may be acceptable for small scale, closed domains, identifying a comprehensive list of entities of a given domain generally may be difficult.

According to an example embodiment, it may be desirable to identify web documents that are exclusively directed to an entity. Example pages of this nature may include a review page of a specific product, or a specification page of a product.

According to an example embodiment, web documents that are exclusively directed to an entity may be identified by performing entity mention identification over the web documents' URL and title, leveraging the entity mention identification example techniques discussed above. According to an example embodiment, tokenization may be performed over URLs to facilitate entity mention identification over URLs. According to an example embodiment, more significant weights may be assigned to co-occurrences that may be determined in such identified exclusive documents. For example, if a document is exclusively directed to an entity, then it may intuitively be more likely the etags mentioned in the documents maybe valid for the specific entity.

However, many entities may not have such exclusive pages. Therefore, this exclusive document identification technique may be employed as a boost to co-occurrence analysis of all matched co-occurrences.

According to an example embodiment, other refinements that maybe applied in enhancing association accuracy may include one or more of: eliminating (i) the effect of mirroring documents by counting duplicated documents only once in aggregation; (ii) the effect of one specific tag or entity appearing multiple times in a document, by only allowing the same (entity, etag) pair output at most once by one document; and/or (iii) the effect of copy/pasting of segments of text, by generating a context signature of etags (e.g., using the five left and right words as a signature). For example, etags with exactly the same contexts may be caused by copy/pasting, and it may be desirable to count such occurrences only once.

According to an example embodiment, the implementation of entity-etag association analysis may be coupled with that of entity mention identification in a distributed MapReduce framework, as discussed above. According to an example embodiment, after an entity mention is identified, the identified entity mention's surrounding context may be checked for etags. According to an example embodiment, matched (entity, etag) pairs may be aggregated across different documents using a Reducer for the co-occurrence frequency analysis.

An experimental study may use a snapshot of the web corpus of high static rank documents, including approximately 1.4 billion documents with a total corpus size of 35.2 T (terabytes). According to an example embodiment, a web corpus may be stored on, and may be accessed from a distributed MapReduce framework, e.g., based on Dryad, as discussed in M. Isard, et al., "Dryad: Distributed Data-Parallel Programs from Sequential Building Blocks," EuroSys '07 Proceedings of the 2nd ACM SIGOPS/EuroSys European Conference on Computer Systems, 2007, pp. 59-72.

According to an example embodiment, experimental results were based on two product domains: a camera domain and a shirt domain. A list of named entities of the two domains was obtained from BING SHOPPING, as discussed further below.

For example, for the camera Domain, 3,557 camera entities were obtained (e.g., RICOH G600 Digital Camera). For example, for the shirt domain, 22,182 shirt entities were obtained (e.g., RALPH LAUREN Childrenswear Striped Oxford Shirt). These two product domains were selected for experiment because they both represent significant vertical domains, while also exhibiting a number of interesting differences. First, unlike the camera domain where entities typically have a unique model name, such as G600, entities in the shirt domain may be more difficult to distinguish from one another. As a result, approximate entity mention identification may potentially yield more errors for the shirt domain. Second, many entities in the camera domain appear relatively well represented on the web, as they are often available on their specification pages and review pages. However, entities in the shirt domain may not be as well represented on the web, with many of their appearances in listing pages (e.g., a listing page of all RALPH LAUREN shirts). These different characteristics of the two domains may thus provide opportunities to study experimental impacts of example techniques in diverse scenarios.

The experimental results are discussed below. In accordance with an example embodiment, 1,166 etags for the camera domain were obtained and 935 etags for the shirt domain were obtained.

According to an example embodiment, a significant number of entity mentions were identified with high quality. For example, in accordance with an example embodiment, on average 2,890 mentions per entity were identified with estimated precision of 98% for the camera domain, and 192 mentions per entity were identified with estimated precision of 96% for the shirt domain.

In accordance with an example embodiment, on average approximately 10 etags per entity were assigned with approximately 85% precision for the camera domain and approximately 8 etags per entity were assigned with approximately 80% precision for the shirt domain. In this context, "recall" may refer to an average number of etags associated to an entity, as an absolute set of etags for an entity may be unknown or difficult to determine.

In accordance with example embodiments, the etags may be determined using the techniques discussed above. For example, the input may include one or more alternative strings that denote a domain. For example, an input for the camera domain may include "camera", "digital camera", and an input for the shirt domain may include "shirt", "t shirt". The output is a set of etags for each respective domain.

According to an example embodiment, for robustness, the threshold δ for filtering may be set to a value of 5, indicating that an etag will be mentioned on the web corpus at least 5 times in the lexical patterns as discussed above, to pass the threshold value. To further ensure the quality of discovered tags, a user may intersect the set of etags generated with queries containing the domain name (or variants) from a search engine query log, thus providing improved accuracy in identifying noun phrases (and thus the quality of the discovered tags), and enabling a user to focus on a set of commonly used etags for easier evaluation. According to experimental results, the set of etags discovered were highly accurate, at almost 100% precision.

TABLE 1

Statistics of Etags Discovered

| Domain | Total Number of Etags |
|---|---|
| Camera | 1,166 |
| Shirt | 935 |

Table 1 as shown above indicates the number of etags discovered for the camera and shirt domains, respectively. In contrast, existing ontologies may have limited coverage. For example, WORDNET has only 11 subclasses under "Camera" and 10 subclasses under "Shirt" (with all hyponyms in the ontology hierarchy considered).

In accordance with example embodiments, the mentions of entity on the experimental snapshot of the web were identified using the example techniques discussed above. For example, the Jaccard containment threshold $\theta$ was set at 0.9, the window size $\alpha$ at 30, and the minimum fraction of matched tokens $\beta$ at 0.5.

The example proposed approximate entity mention identification may be compared against exact entity mention identification, to determine a precision-recall tradeoff: how much may be lost in entity mention identification accuracy and how much may be gained in the number of entity mentions identified. According to an example embodiment, the median number of entity mentions identified may be used, to reduce the effect of very popular entities which may have a significantly higher number of mentions on the web.

TABLE 2

Entity Mention Identification Results

| | Estimated Accuracy | Median # of Mentions |
|---|---|---|
| Camera | | |
| Exact Match | 100% | 36 |
| Approx Match | 98% | 221 |
| Shirt | | |
| Exact Match | 100% | 7 |
| Approx Match | 96% | 16 |

As shown above, Table 2 indicates an experimental comparison result for the camera and shirt domains. For example, the accuracy may be estimated by manually analyzing a random sample of entity mentions of 50 camera entities and 50 shirt entities identified by example techniques discussed herein. Compared to exact matching, significantly more entity mentions may be obtained using approximate matching at the cost of a small loss in accuracy due to approximate matching.

According to experimental results, on average, 2,890 entity mentions per entity were identified for the camera domain and 192 entity mentions per entity were identified for the shirt domain. The significant number of entity mentions identified per entity may provide a foundation for a subsequent association analysis, which may rely on large scale aggregation.

With etags discovered for each domain, and the entity mentions in the domains identified, the association techniques discussed herein for assigning etags to entities may be experimentally evaluated, to analyze output of the example system, of etags associated with the entities from the two domains.

For example, for each domain, 50 entities may be randomly selected among the entities that have more than 20 mentions identified on the experimental web corpus. For example, the threshold 20 may be empirically selected as the basic limit to perform statistical analysis over the entities. According to experimental results, 2,811 qualifying camera entities and 10,103 qualifying shirt entities, respectively, were obtained.

To validate a proposition that adapted lexical patterns, by themselves, may provide unacceptable recall, the adapted lexical pattern approach (referred to as the baseline approach) may be implemented for determining etags of entities, as discussed above. According to experimental results, on average, each camera entity was tagged with 0.2 tags, and each shirt entity was tagged with 0.06 tags, indicating low numbers.

In accordance with example embodiments, the accuracy of the results generated by the example system may be evaluated via expert judgment. For example, for an etag t assigned to an $\mathcal{N}_\mathcal{D}$ entity e under domain $\mathcal{D}$ with a domain name $n_\mathcal{D} \in \mathcal{N}_\mathcal{D}$, an expert may be asked to answer the question: "is entity e a t $n_\mathcal{D}$ ?" (i.e., "does entity e belong to the t subclass of domain $\mathcal{D}$ ?"). For example, for entity RICOH G600 Digital Camera and etag "waterproof" in the camera domain, the expert may be asked to answer the question: "is RICOH G600 Digital Camera a waterproof camera?" For example, this evaluation may represent the end-to-end accuracy of the overall system.

Several factors may lead to errors in example systems discussed herein, such as: (i) etags of some other entities that appear in close proximity to the target entity may be incorrectly assigned to the target entity (e.g., for listing pages wherein a list of entities may be mentioned); (ii) incorrect entity mention identification may induce incorrect associations, since the associated etags may be directed to a different entity; (iii) ambiguous tags (e.g., tags that are legitimate by themselves, but which may have different meanings under different contexts). For example, in a camera domain, "manual", "tracking" are legitimate etags, as they describe subclasses of cameras: "manual camera" and "tracking camera" respectively. However, their appearances on the web may refer to other meanings For example, "manual" may be mentioned under the meaning of handbook.

TABLE 3

Example Etags Associated to Entities

| Domain | Entity | Associated Etags |
|---|---|---|
| Camera | RICOH G600 Digital Camera | waterproof, outdoor, rugged, 10 mp, ... |
| Camera | Go Photo Easy Pix 30 Digital Camera | pink, blue, ultra compact, mini, ... |
| Camera | Sony Cyber-shot DSC-W220 Point and Shoot Camera | image stabilized, digital zoom, compact, ... |
| Shirt | Ralph Lauren Childrenswear Striped Oxford Shirt | polo, soft, ... |
| Shirt | Dogwood Boys Striped Short Sleeve Polo | light blue, little boys, cotton, ... |
| Shirt | Under Armour Heatgear Short Sleeve Tee Girls | base layer, moisture wicking, casual, lightweight, ... |

Table 3 as shown above illustrates example entities with etags associated to them by experimental results of example techniques discussed herein.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one device processor;
   an etag collector that obtains a determined set of a plurality of determined description indicators that have been determined as description indicators that are specifically associated with a first domain;
   an entity receiving component that obtains an entity indicator associated with the first domain;
   a context determination component that initiates, via one or more of the at least one device processor, an analysis of a plurality of documents to identify occurrences of mentions of the obtained entity indicator and contexts associated with each of the occurrences of the mentions in each one of the plurality of documents;
   a proximity determination component that, for each one of the plurality of documents that includes one or more of the determined description indicators that are also included in the previously determined set, and one or more identified occurrences of mentions of the obtained entity indicator, determines proximities of the determined description indicators, from the previously determined set, to the identified occurrences of mentions of the obtained entity indicator, based on the obtained contexts;
   an etag association component that generates a description tag association between the obtained entity indicator and one of the description indicators from the determined plurality of description indicators associated with the first domain, using the determined proximities; and
   a fitness evaluator that determines a measure of fitness associated with the description tag.

2. The system of claim 1, wherein:
   the etag collector is configured to obtain the plurality of description indicators associated with the first domain based on determining the description indicators based on lexical patterns that include one of the description indicators and a name associated with the first domain.

3. The system of claim 1, wherein:
   the description indicators include one or more attributes associated with one or more entities that represent instances of items included in the first domain.

4. The system of claim 1, wherein:
   the context determination component is configured to initiate the analysis of the plurality of documents to identify occurrences of mentions of the obtained entity indicator and contexts associated with each of the occurrences of the mentions in each one of the plurality of documents, based on identifying co-occurrences of the mentions of the obtained entity indicator within a proximity window in text included in each one of the plurality of documents.

5. The system of claim 1, wherein:
the fitness evaluator determines the measure of fitness associated with the description tag association based on a goodness of fit value, determined in accordance with:

$$G\text{-test} = 2O(e, t)\ln\left(\frac{O(e, t)}{E(e, t)}\right) + 2(Nw - O(e, t))\ln\left(\frac{N_{N_W} - O(e, t)}{N_W - E(e, t)}\right) \approx$$
$$2O(e, t)\ln\left(\frac{O(e, t)}{E(e, t)}\right),$$

wherein
$\mathcal{W}$ represents a set of web documents,
$\mathcal{N}_\mathcal{W}$ represents a number of documents in the set $\mathcal{W}$,
e represents one of the entity mentions,
t represents one of the description indicators,
O(e, t) indicates a number of documents in the set $\mathcal{W}$ that include both t and e, and
E(e, t) represents an expected co-occurrence frequency, indicated as $$E(e, t) = \frac{Freq(e)}{N_{N_W}} \frac{Freq(t)}{N_W} N_W = \frac{Freq(e)Freq(t)}{N_W},$$

wherein
Freq(e) represents a number of documents in the set $\mathcal{W}$ wherein a e is identified, and
Freq(t) represents a number of documents in the set $\mathcal{W}$ wherein t is identified.

6. The system of claim 1, wherein:
the proximity determination component is configured to determine proximities of the description indicators to the occurrences of mentions of the obtained entity indicator, based on a number of tokens between each of the description indicators and occurrences of mentions of the obtained entity indicator.

7. The system of claim 1, further comprising:
an entity-specific determination component that determines whether one or more of the plurality of documents includes a significant percentage of text that is focused on one or more mentions of the obtained entity indicator.

8. The system of claim 1, further comprising:
a token determination component that determines one or more tokens associated with the obtained entity indicator, the one or more tokens included in one or more name variants associated with the obtained entity indicator.

9. The system of claim 8, further comprising:
a token weight assignment component that assigns a weight to each respective one of the tokens associated with the obtained entity indicator.

10. The system of claim 9, wherein:
the context determination component is configured to initiate the analysis of the plurality of documents to identify occurrences of mentions of the obtained entity indicator and contexts associated with each of the occurrences of the mentions in each one of the plurality of documents, the identification of the mentions based on an analysis of Jaccard containment of subsequences of tokens included in a set of web documents, via a MapReduce platform.

11. The system of claim 8, further comprising:
an entity index generation component that generates an inverted index based on the one or more name variants associated with the obtained entity indicator,
wherein identifying occurrences of mentions of the obtained entity indicator is based on accessing the inverted index.

12. The system of claim 11, wherein:
the entity index generation component is configured to generate the inverted index based on the one or more name variants associated with the obtained entity indicator, based on prefix filtering.

13. The system of claim 11, wherein:
the entity index generation component is configured to generate the inverted index based on the one or more name variants associated with the obtained entity indicator, based on:
individual token inverted index entries, or tokenset inverted index entries.

14. A method comprising:
determining a plurality of description phrases that are determined as description phrases associated with a first domain, based on an analysis of a first plurality of documents to determine co-occurrences of the description phrases with one or more name labels associated with the first domain, based on a plurality of text variants of Hearst patterns;
obtaining an entity associated with the first domain;
initiating, via a MapReduce platform, an analysis of a second plurality of documents to identify occurrences of mentions of the obtained entity and contexts associated with each of the occurrences of the mentions in each one of the second plurality of documents based on a set-based similarity containment analysis; and
generating, via a device processor, a description tag association between the obtained entity and one of the determined description phrases from the determined plurality of description phrases associated with the first domain, using the identified occurrences of mentions of the obtained entity and contexts associated with each of the occurrences of the mentions.

15. The method of claim 14, further comprising:
determining proximities of the description phrases to the occurrences of mentions of the obtained entity, for each one of the second plurality of documents that includes one or more of the description phrases and one or more of the occurrences of mentions of the obtained entity, based on the obtained contexts, wherein
generating the description tag association includes generating the description tag association between the obtained entity and one of the description phrases, based on the determined proximities.

16. The method of claim 15, wherein:
determining proximities of the description phrases to the occurrences of mentions of the obtained entity includes:
determining a number of tokens separating the respective description phrases from the occurrences of mentions of the obtained entity included in subsequences of tokens included in each one of the second plurality of documents that includes one or more of the description phrases and one or more of the occurrences of mentions of the obtained entity.

17. A computer program product comprising a hardware machine readable storage device storing executable instructions that cause at least one data processing apparatus to:
determine a plurality of description phrases that are determined as description phrases associated with a first domain, based on an analysis of a first plurality of documents to determine co-occurrences of the description phrases with one or more name labels associated with the first domain, based on a plurality of text variants of Hearst patterns;
obtain an entity associated with the first domain;
initiate, via a MapReduce platform, an analysis of a second plurality of documents to identify co-occurrences of mentions of the obtained entity and one or more of the plurality of determined description phrases, and contexts associated with each of the co-occurrences of the mentions and determined description phrases, in each one of the second plurality of documents based on a set-based similarity containment analysis; and
generate a description tag association between the obtained entity and one of the determined description phrases from the determined plurality of description phrases associated with the first domain, using the identified co-occurrences of mentions of the obtained entity and one or more of the plurality of determined description phrases, and an analysis of the identified contexts.

18. The computer program product of claim 17, wherein:
the first plurality of documents and the second plurality of documents are each included in a set of web documents, wherein
initiating the analysis of the second plurality of documents to identify co-occurrences of mentions of the obtained entity and one or more of the plurality of description phrases, and contexts associated with each of the co-occurrences of the mentions and description phrases, in each one of the second plurality of documents includes initiating the analysis via a MapReduce platform.

19. The computer program product of claim 17, wherein the executable instructions cause the at least one data processing apparatus to:
determine proximities of the description phrases to the occurrences of mentions of the obtained entity, for each one of the second plurality of documents that includes one or more of the description phrases and one or more of the occurrences of mentions of the obtained entity, based on the obtained contexts, wherein
generating the description tag association includes generating the description tag association between the obtained entity and one of the description phrases, based on the determined proximities.

20. The computer program product of claim 19, wherein the executable instructions cause the at least one data processing apparatus to:
initiate, via the MapReduce platform, the analysis of the second plurality of documents to identify co-occurrences of the mentions of the obtained entity and one or more of the plurality of description phrases, and contexts associated with each of the co-occurrences of the mentions and description phrases, an identification of the mentions based on an analysis of Jaccard containment of subsequences of tokens included in a set of web documents.

* * * * *